United States Patent
Ohmura et al.

(10) Patent No.: US 10,438,058 B2
(45) Date of Patent: Oct. 8, 2019

(54) INFORMATION PROCESSING APPARATUS, INFORMATION PROCESSING METHOD, AND PROGRAM

(71) Applicant: SONY CORPORATION, Tokyo (JP)

(72) Inventors: Junki Ohmura, Kanagawa (JP); Michinari Kohno, Tokyo (JP); Takuo Ikeda, Tokyo (JP); Kenichi Okada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 602 days.

(21) Appl. No.: 14/417,859

(22) PCT Filed: Oct. 1, 2013

(86) PCT No.: PCT/JP2013/005859
§ 371 (c)(1),
(2) Date: Jan. 28, 2015

(87) PCT Pub. No.: WO2014/073149
PCT Pub. Date: May 15, 2014

(65) Prior Publication Data
US 2015/0262005 A1   Sep. 17, 2015

(30) Foreign Application Priority Data
Nov. 8, 2012   (JP) .................................. 2012-246118

(51) Int. Cl.
*G06K 9/00*   (2006.01)
*G06F 3/16*   (2006.01)
(Continued)

(52) U.S. Cl.
CPC .......... *G06K 9/00362* (2013.01); *G06F 3/011* (2013.01); *G06F 3/017* (2013.01);
(Continued)

(58) Field of Classification Search
CPC ........................... G06F 3/017; G06K 9/00355
See application file for complete search history.

(56) References Cited

U.S. PATENT DOCUMENTS

2002/0026320 A1\* 2/2002 Kuromusha .......... G06F 3/0481
704/270
2008/0214253 A1\* 9/2008 Gillo ....................... A63F 13/31
463/1
(Continued)

FOREIGN PATENT DOCUMENTS

EP   2 509 070 A1   10/2012
JP   2012-58838 A   3/2012
(Continued)

OTHER PUBLICATIONS

International Search Report dated Feb. 13, 2014 in PCT/JP2013/005859.

*Primary Examiner* — William C Vaughn, Jr.
*Assistant Examiner* — Jerry T Jean Baptiste
(74) *Attorney, Agent, or Firm* — Xsensus LLP

(57) ABSTRACT

An information processing includes processing circuitry configured to generate data to control a display device to superimpose on a displayed image a control object associated with a voice input, wherein the displayed image is a feedback image of a gesture operation performed by a user, and the displayed image is an image derived from a camera-captured image.

19 Claims, 22 Drawing Sheets

(51) Int. Cl.
*G06F 3/01* (2006.01)
*H04N 21/4223* (2011.01)
*H04N 21/85* (2011.01)
*G06F 3/0484* (2013.01)

(52) U.S. Cl.
CPC ............ *G06F 3/0484* (2013.01); *G06F 3/165* (2013.01); *G06F 3/167* (2013.01); *G06K 9/00355* (2013.01); *H04N 21/4223* (2013.01); *H04N 21/85* (2013.01); *G06K 2209/03* (2013.01); *G06K 2209/21* (2013.01)

(56) References Cited

U.S. PATENT DOCUMENTS

| | | | |
|---|---|---|---|
| 2010/0009720 A1* | 1/2010 | Cha | G06F 1/1624 455/566 |
| 2011/0193778 A1* | 8/2011 | Lee | G06F 3/005 345/158 |
| 2012/0259638 A1 | 10/2012 | Kalinli | |
| 2013/0050458 A1 | 2/2013 | Kim et al. | |
| 2013/0085757 A1* | 4/2013 | Nakamura | G10L 15/22 704/254 |
| 2013/0304479 A1* | 11/2013 | Teller | G06F 3/013 704/275 |
| 2016/0259409 A1* | 9/2016 | Lee | A63F 13/10 |

FOREIGN PATENT DOCUMENTS

WO  WO 2008/109299 A2  9/2008
WO  WO 2011/059202 A2  5/2011

\* cited by examiner

[Fig. 1]
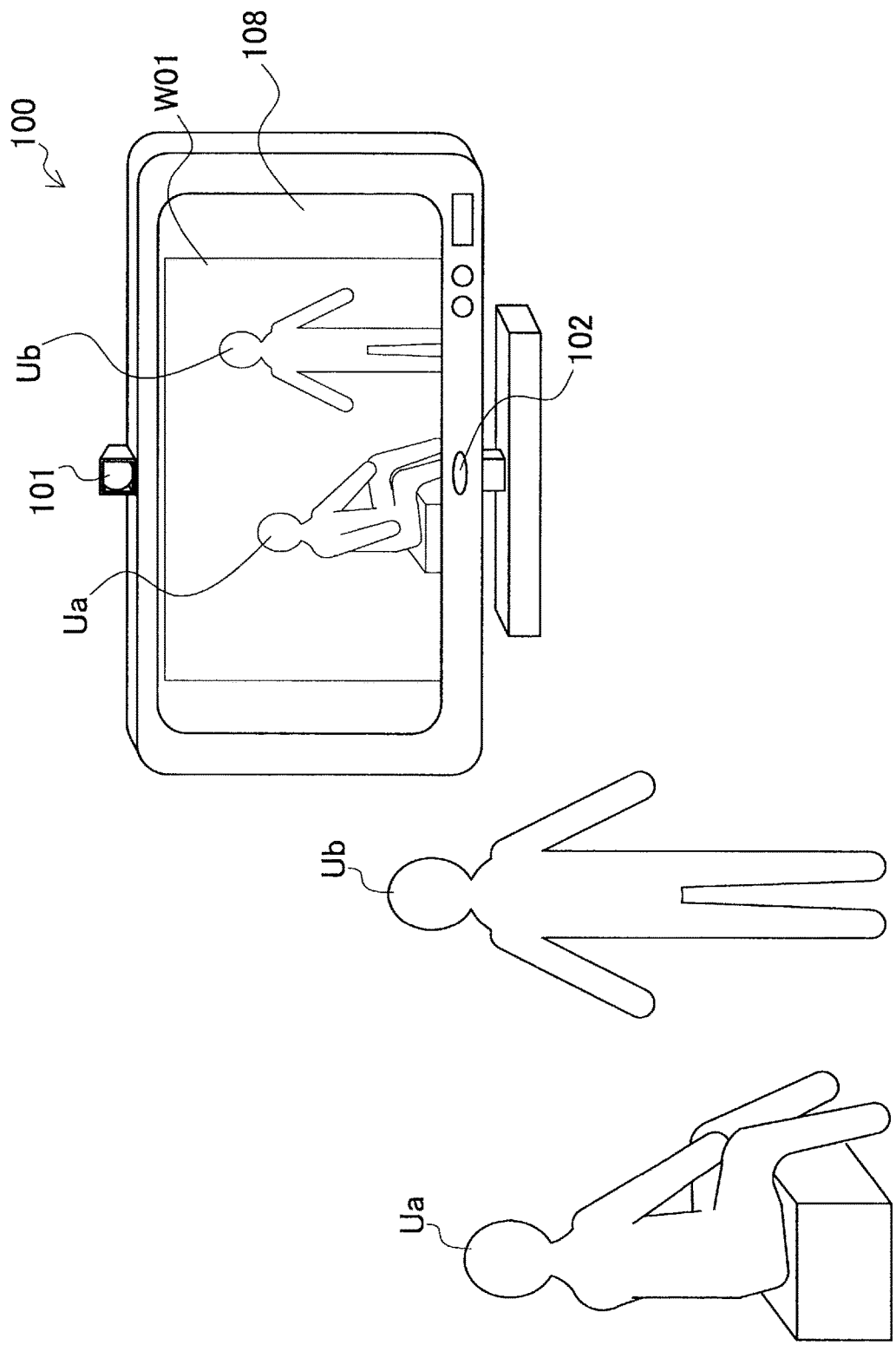

[Fig. 2]
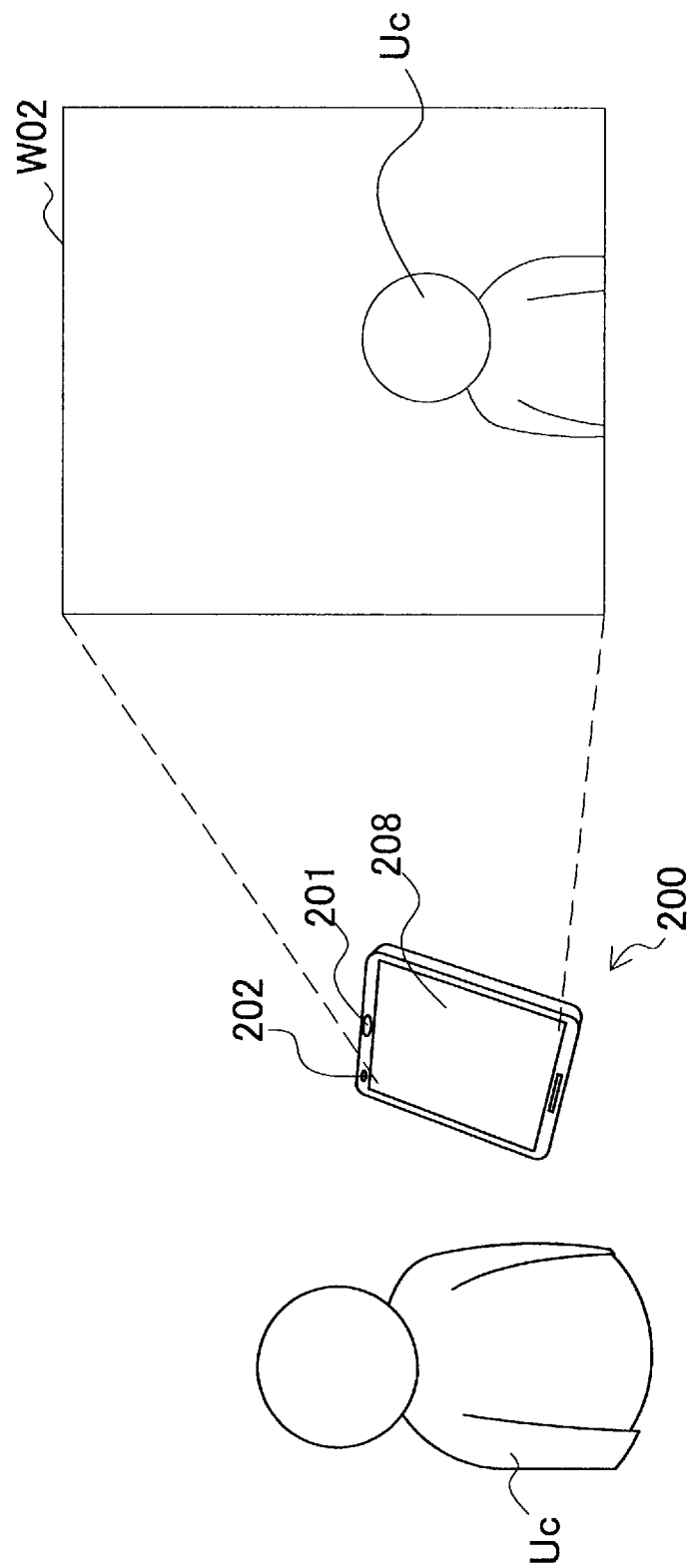

[Fig. 3]
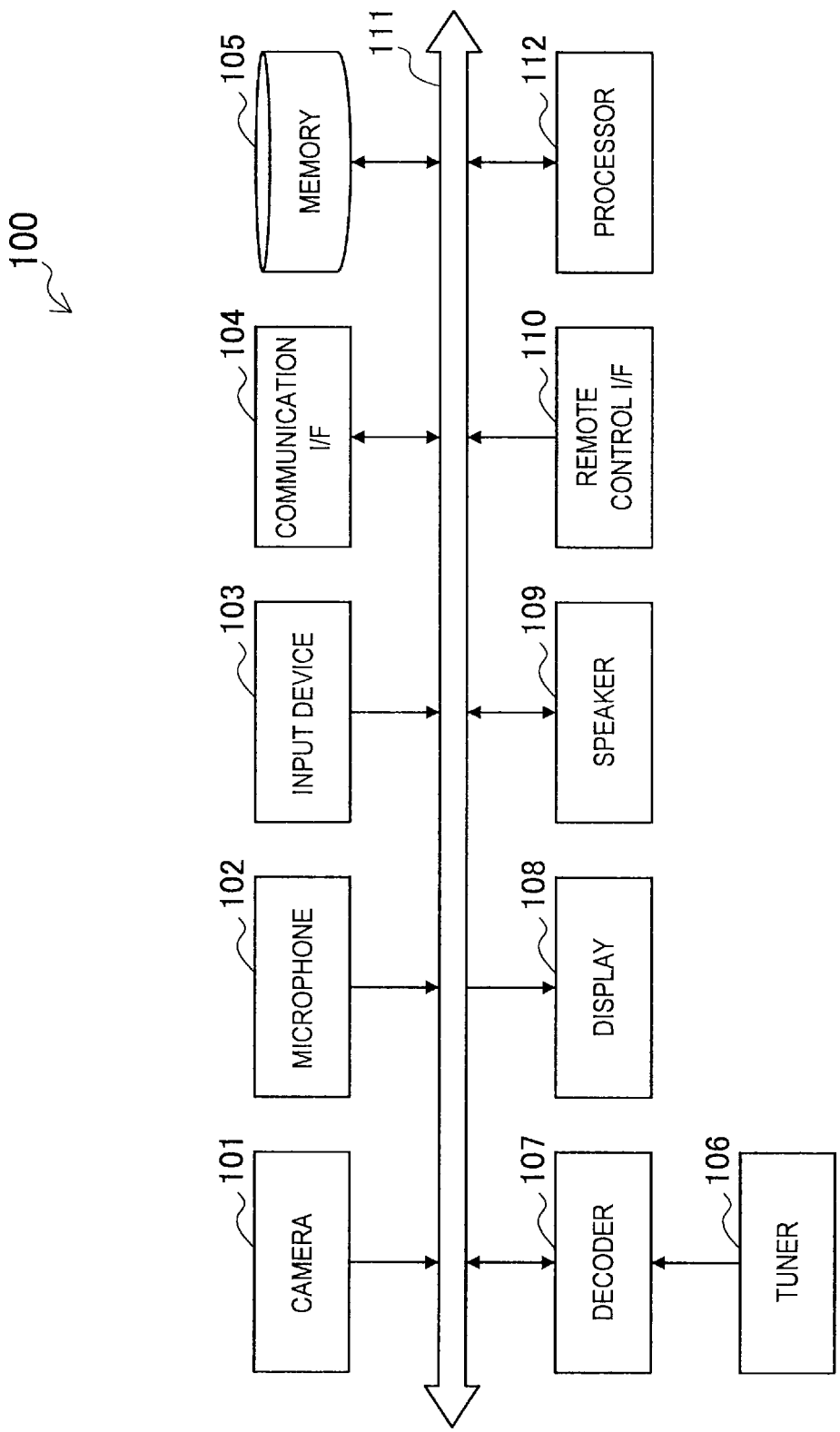

[Fig. 4]
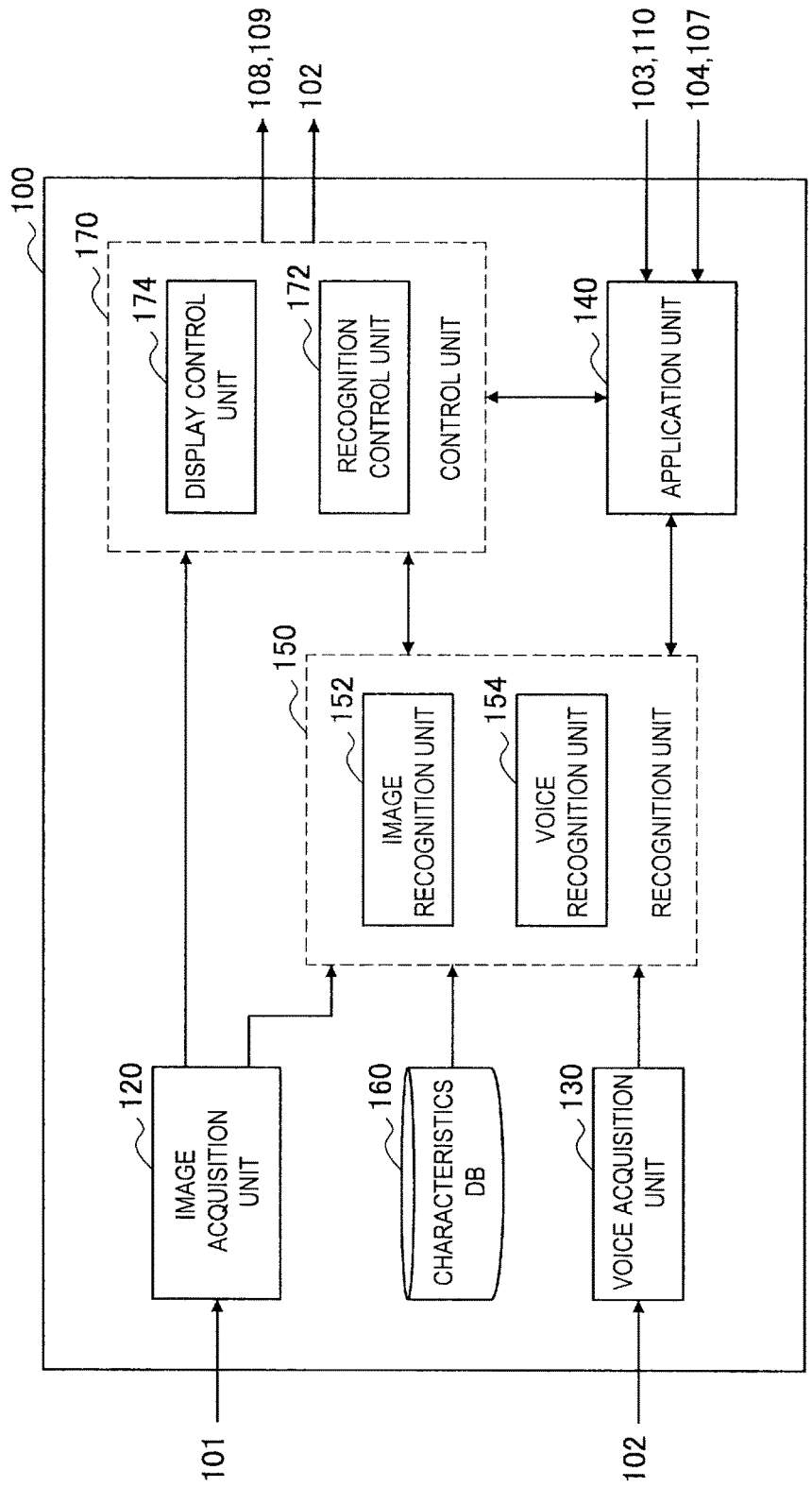

[Fig. 5]
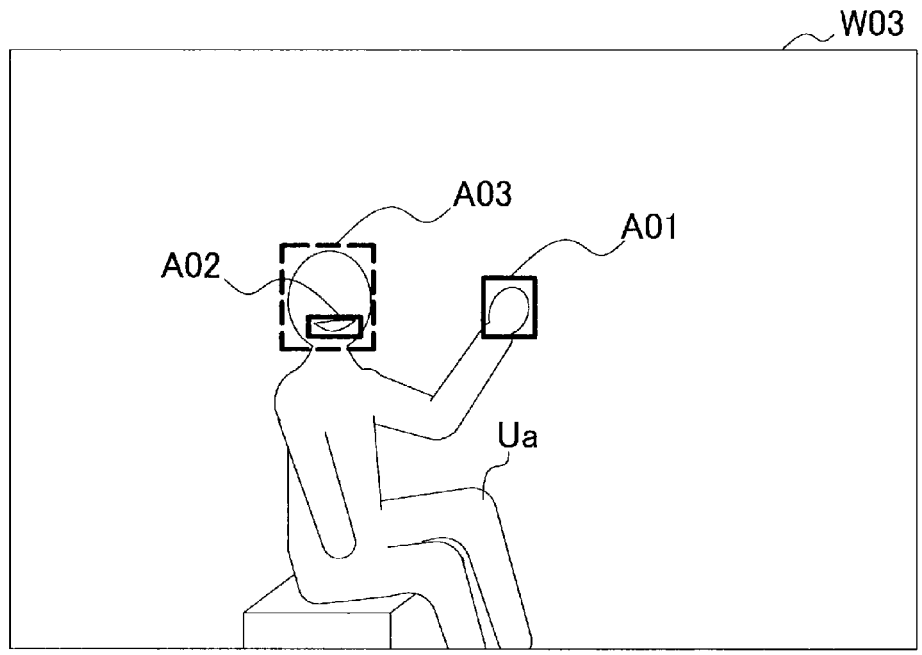
[Fig. 6]
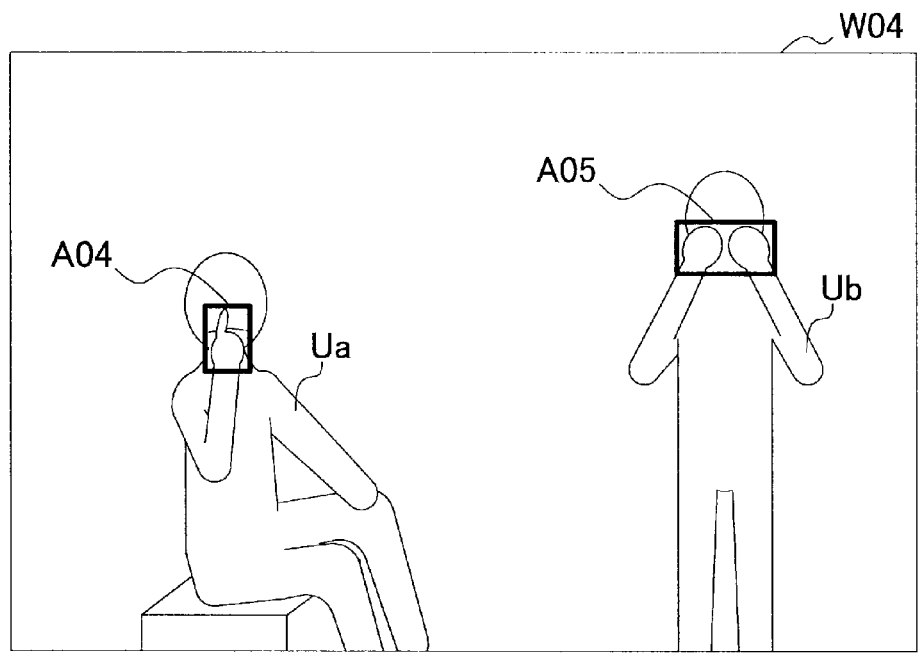

[Fig. 7]
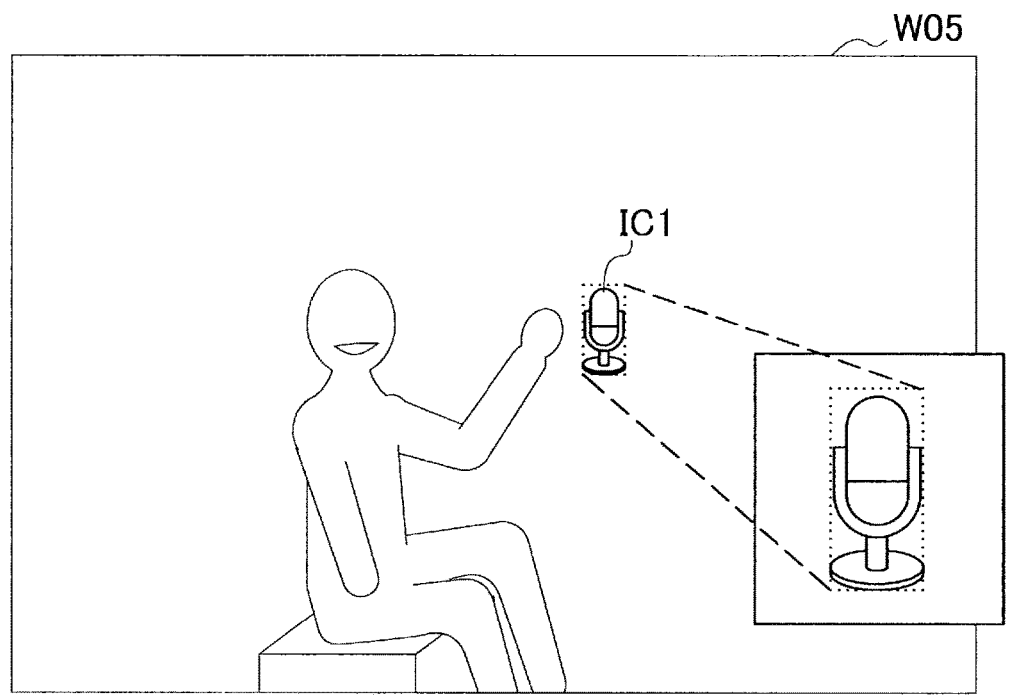
[Fig. 8]
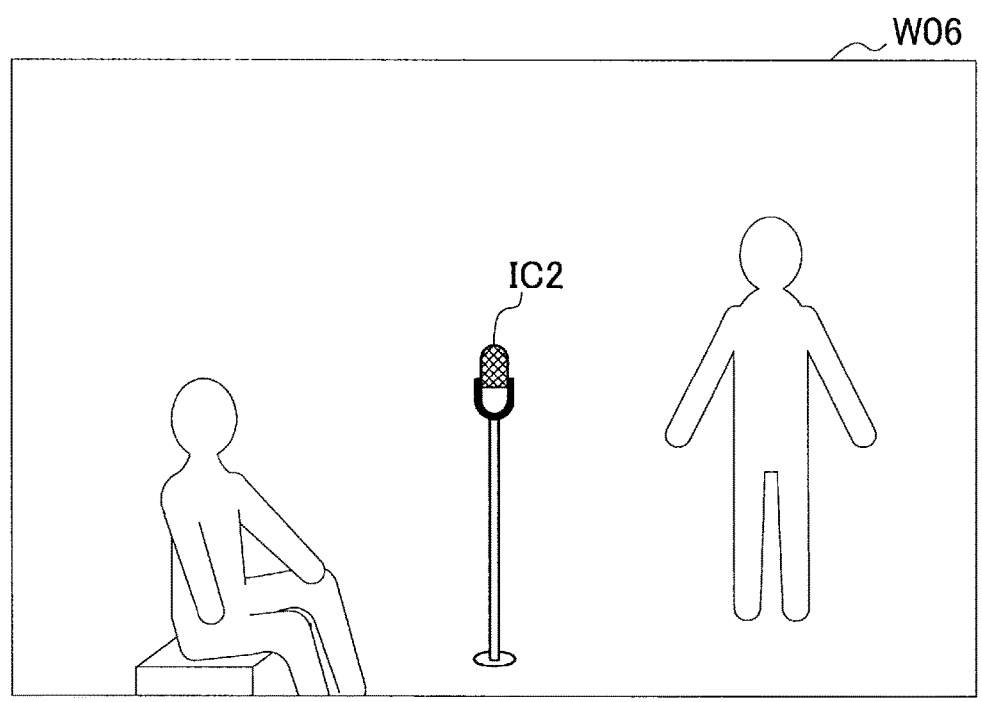

[Fig. 9]
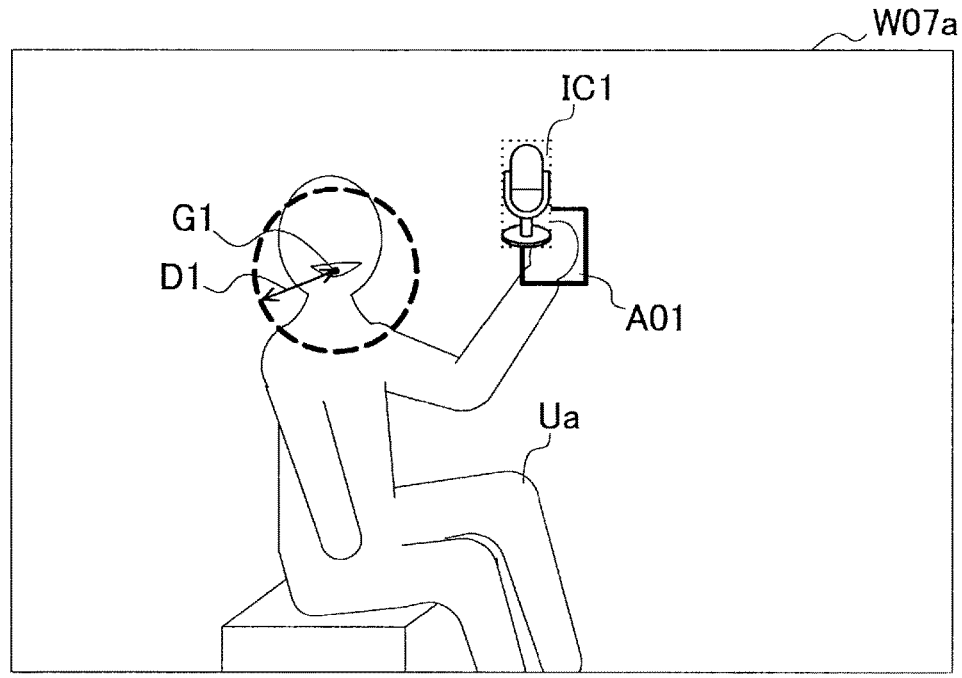
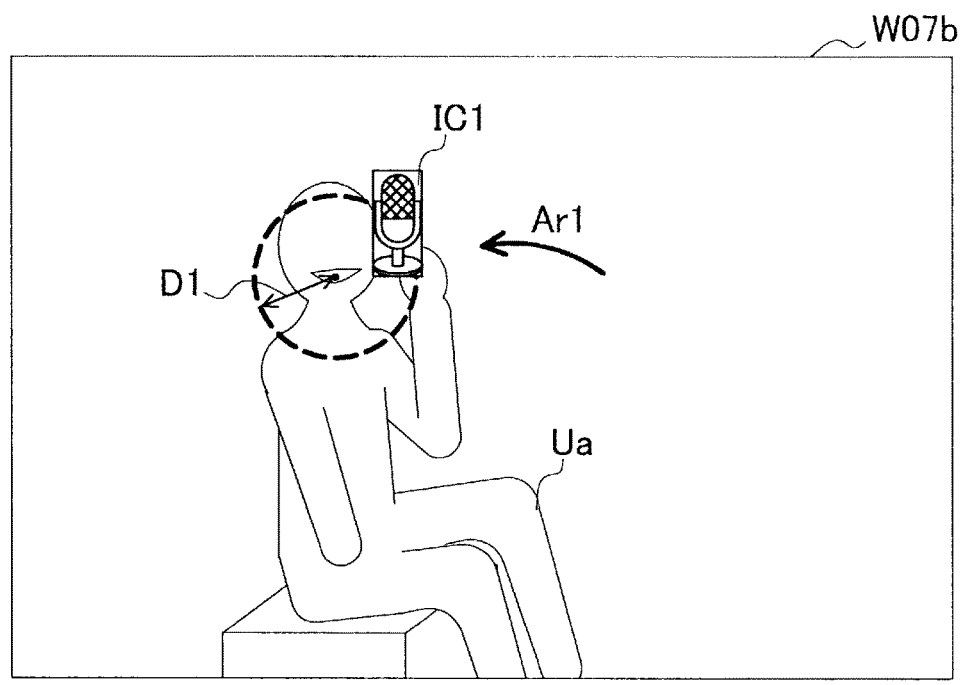

[Fig. 10]
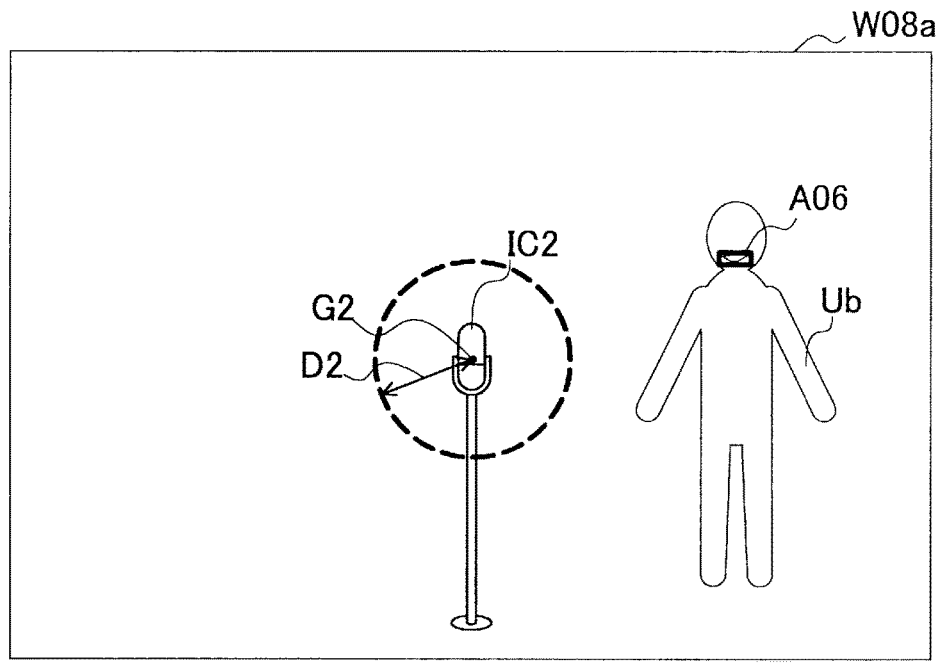
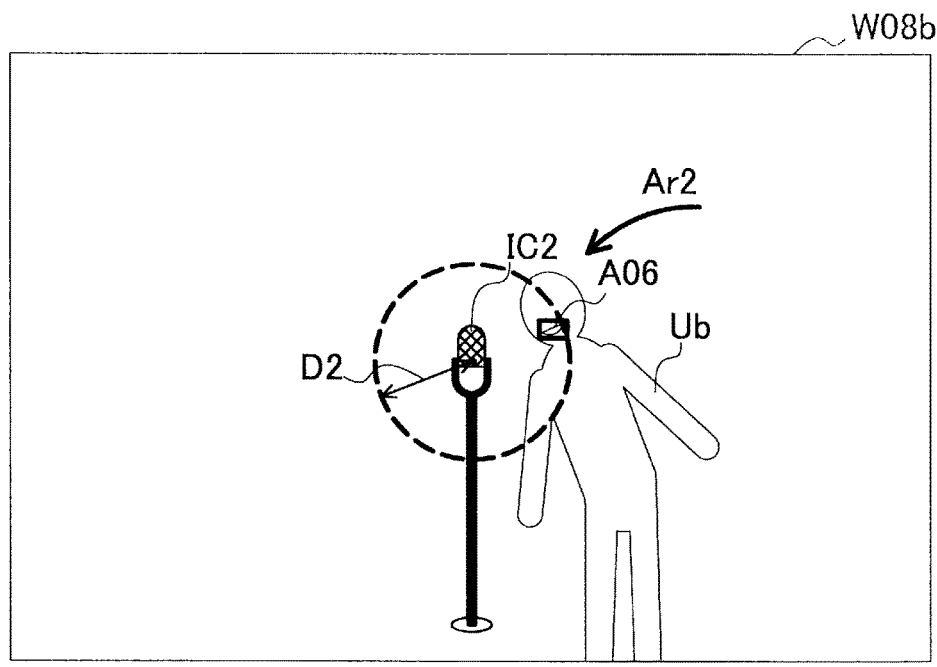

[Fig. 11]
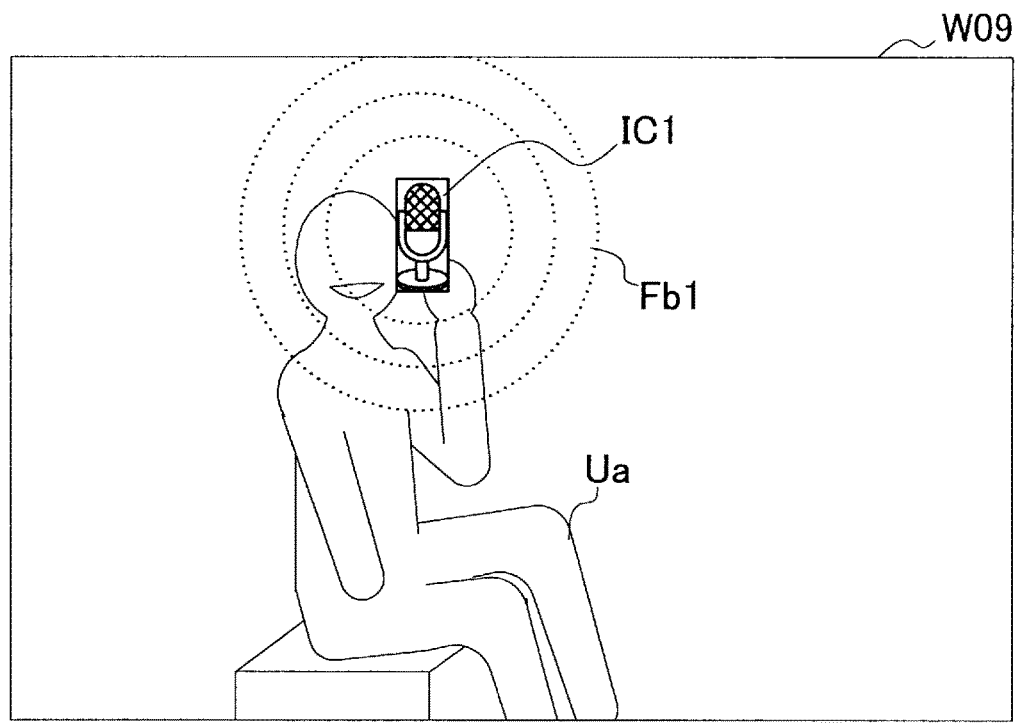
[Fig. 12]
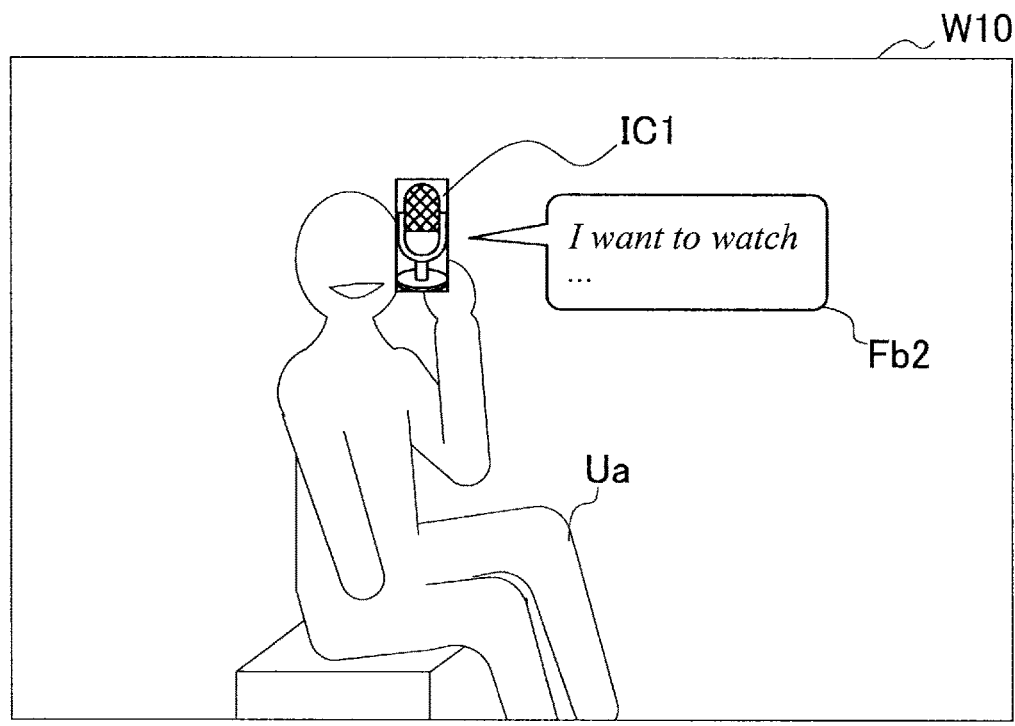

[Fig. 13]
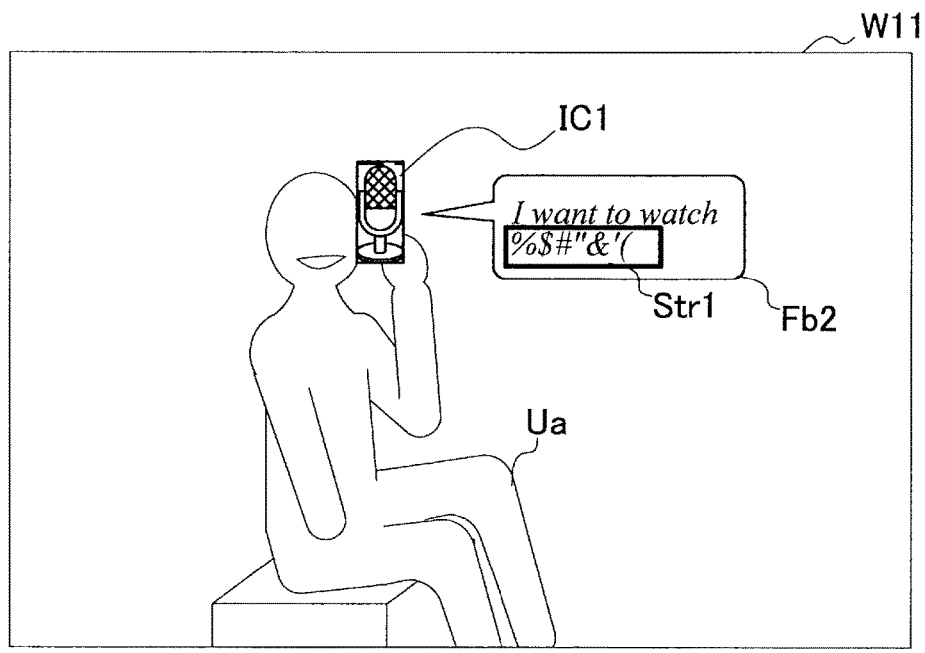
[Fig. 14]
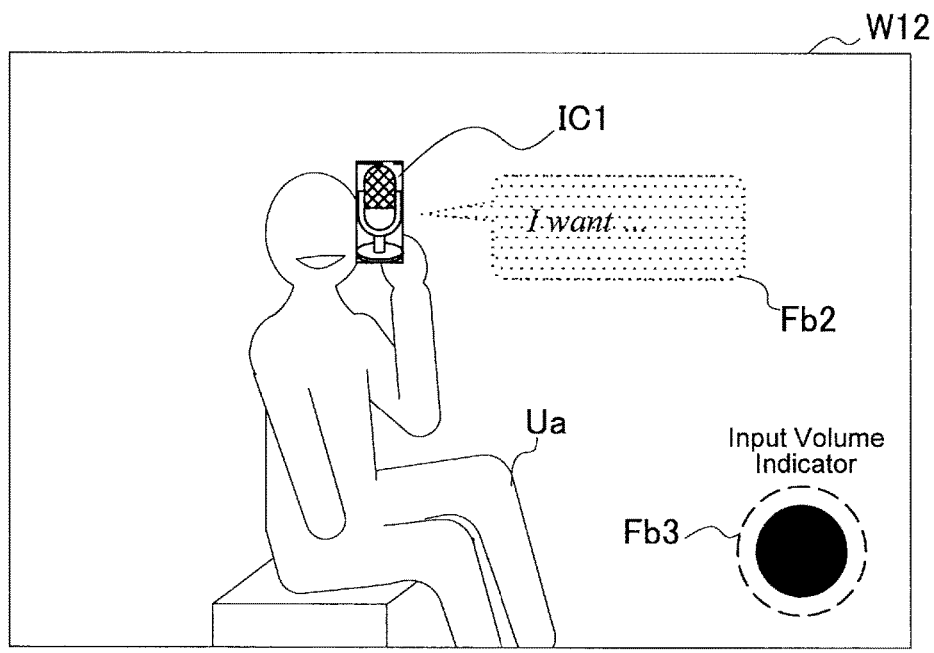

[Fig. 15]
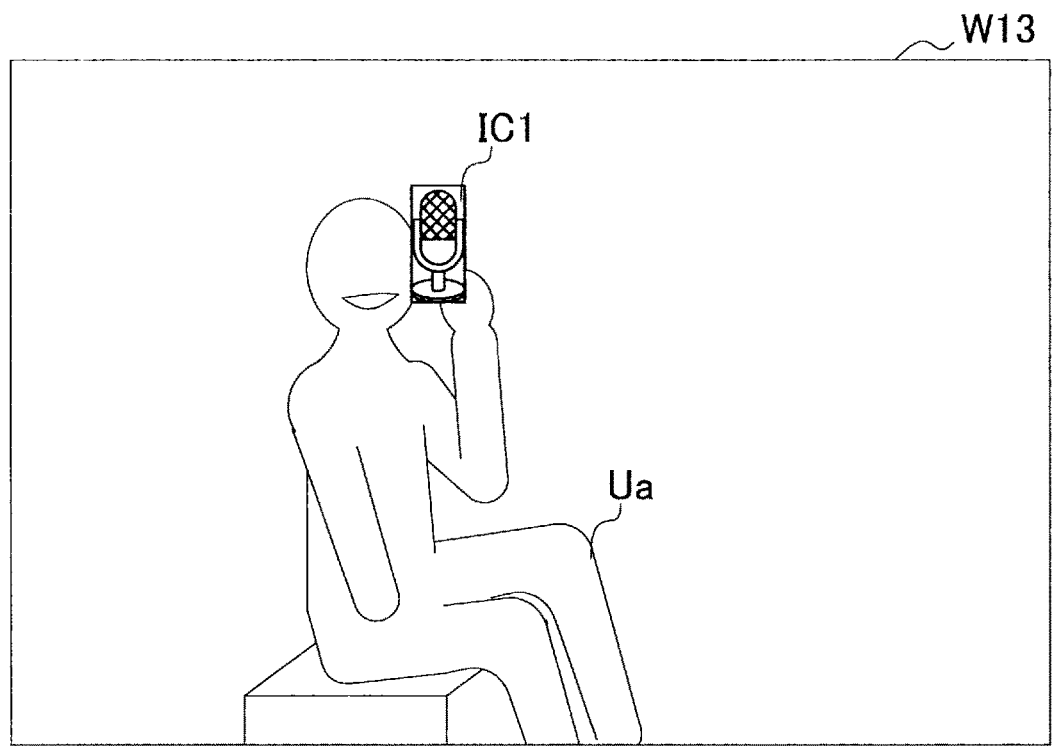
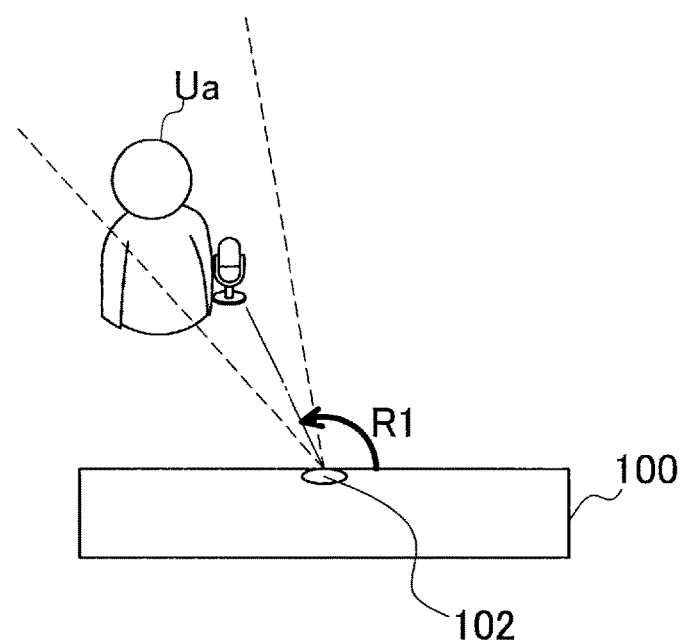

[Fig. 16]
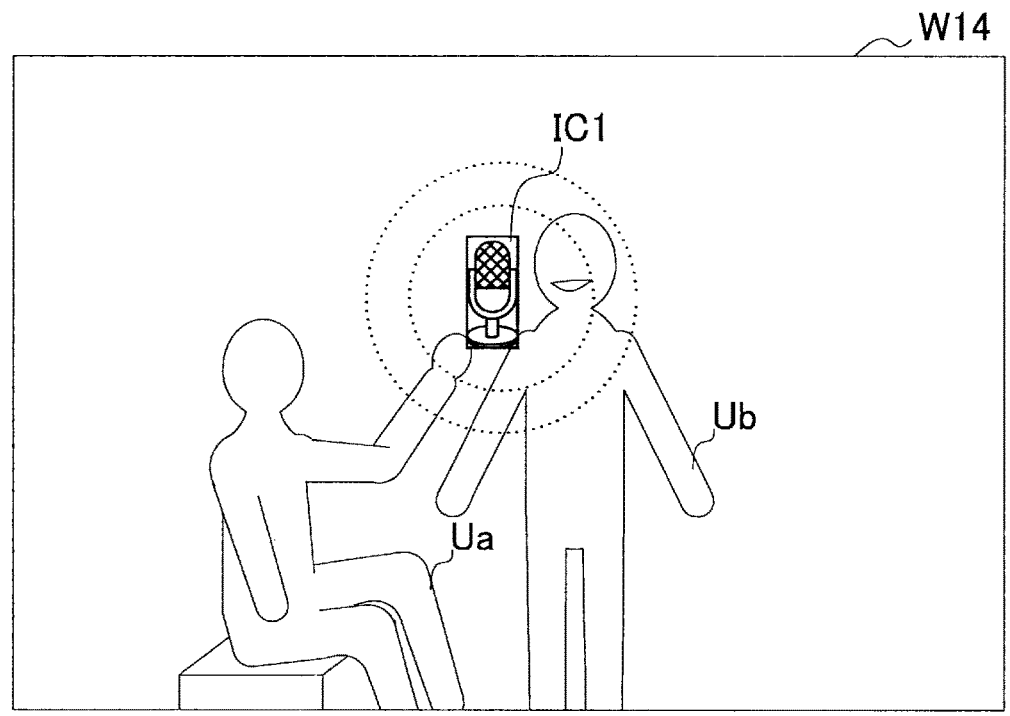
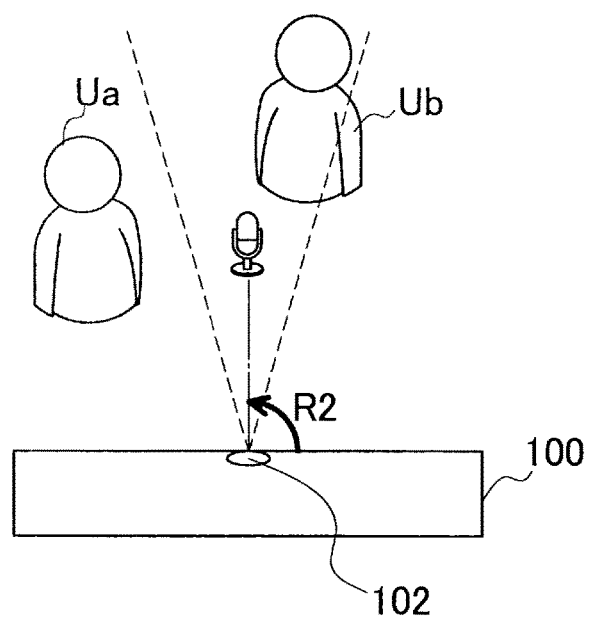

[Fig. 17]
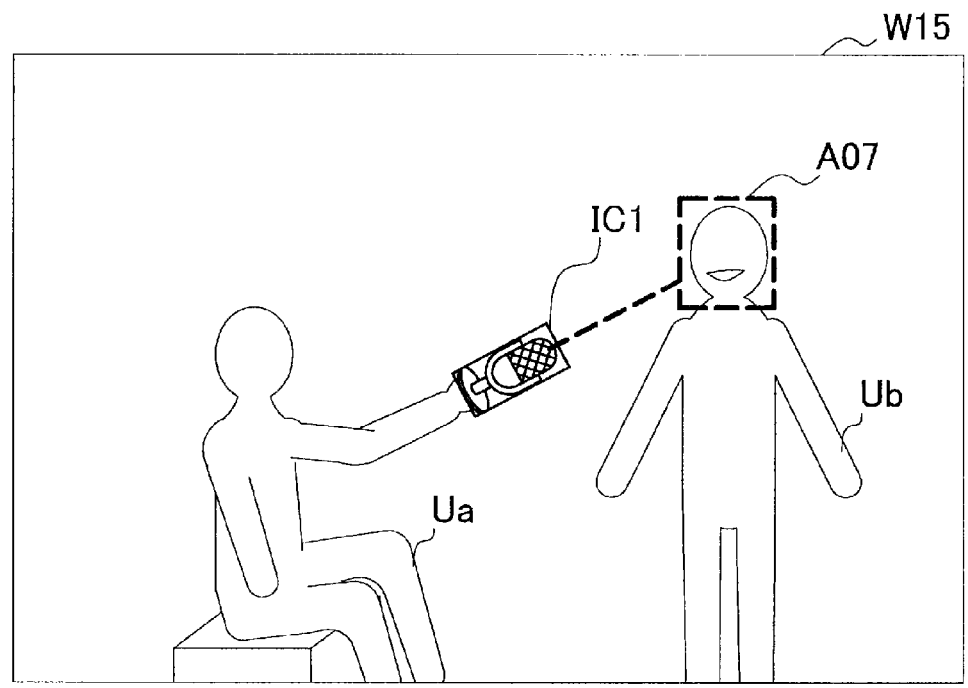
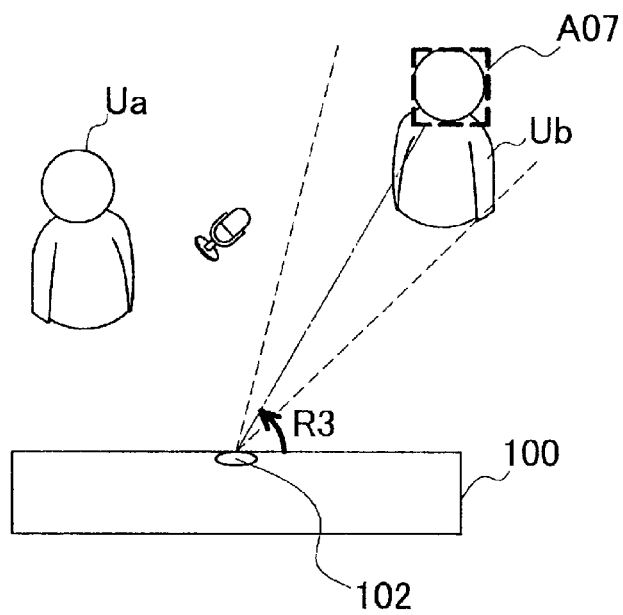

[Fig. 18]
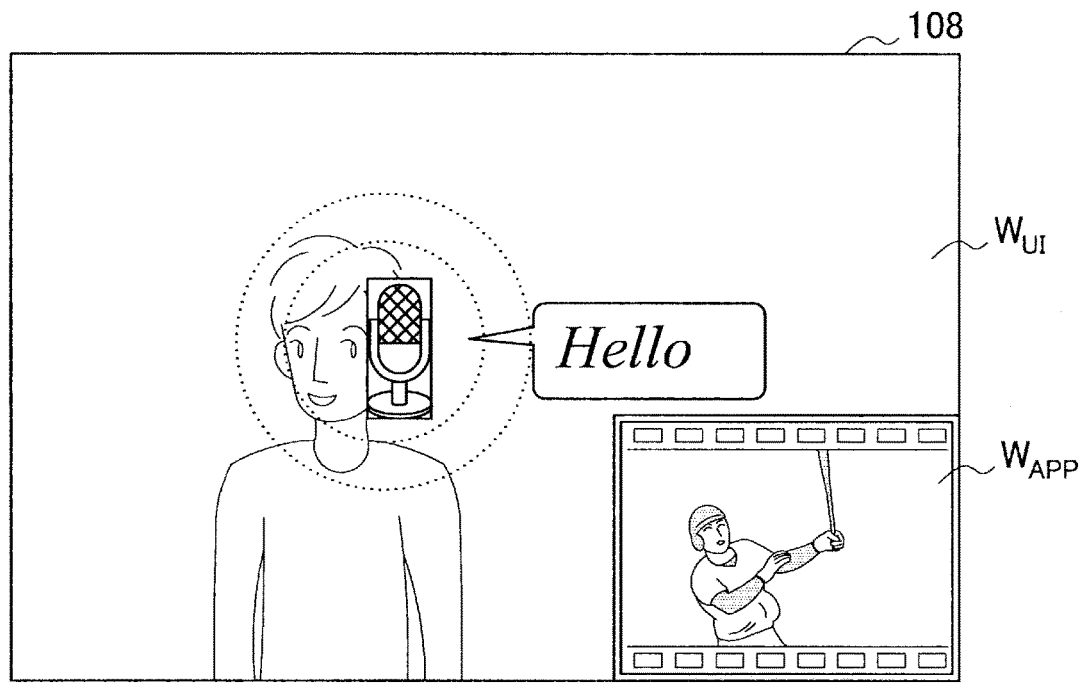
[Fig. 19]
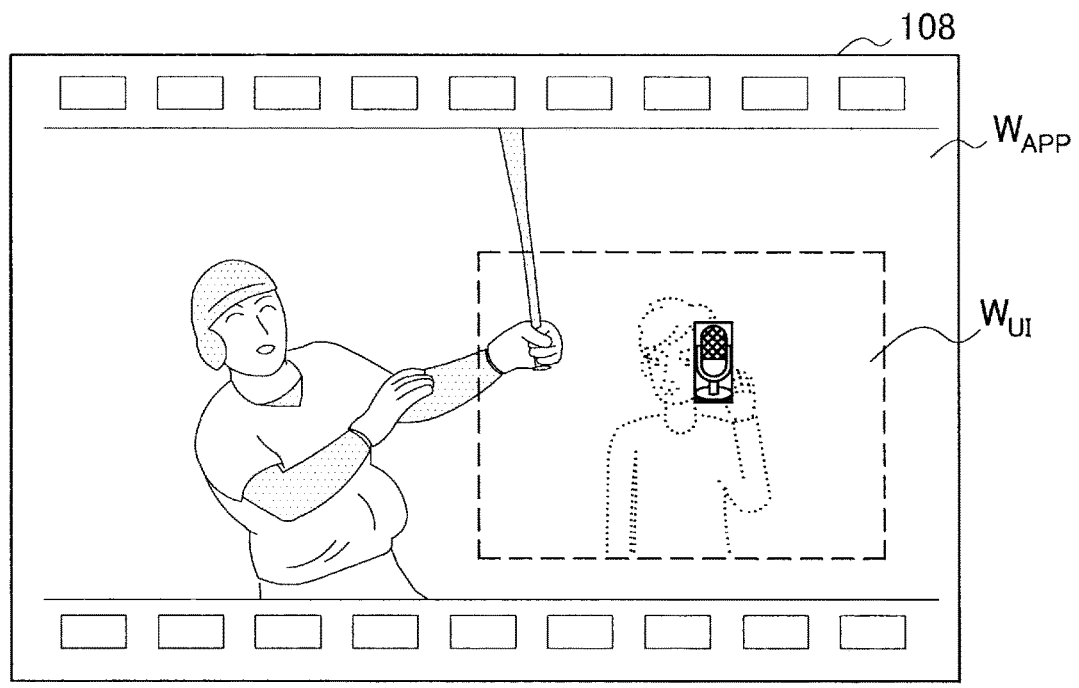

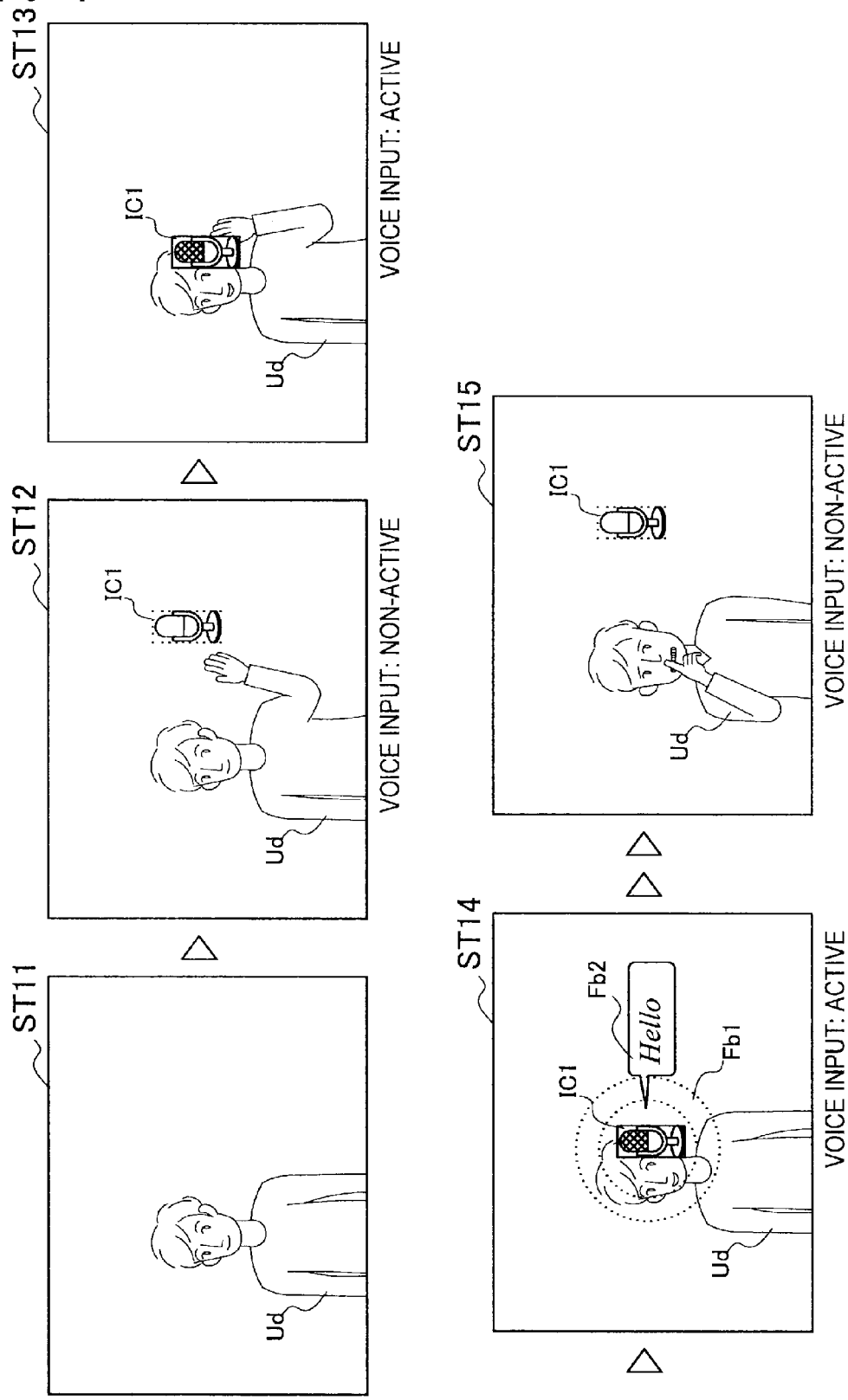
[Fig. 20]

[Fig. 21]
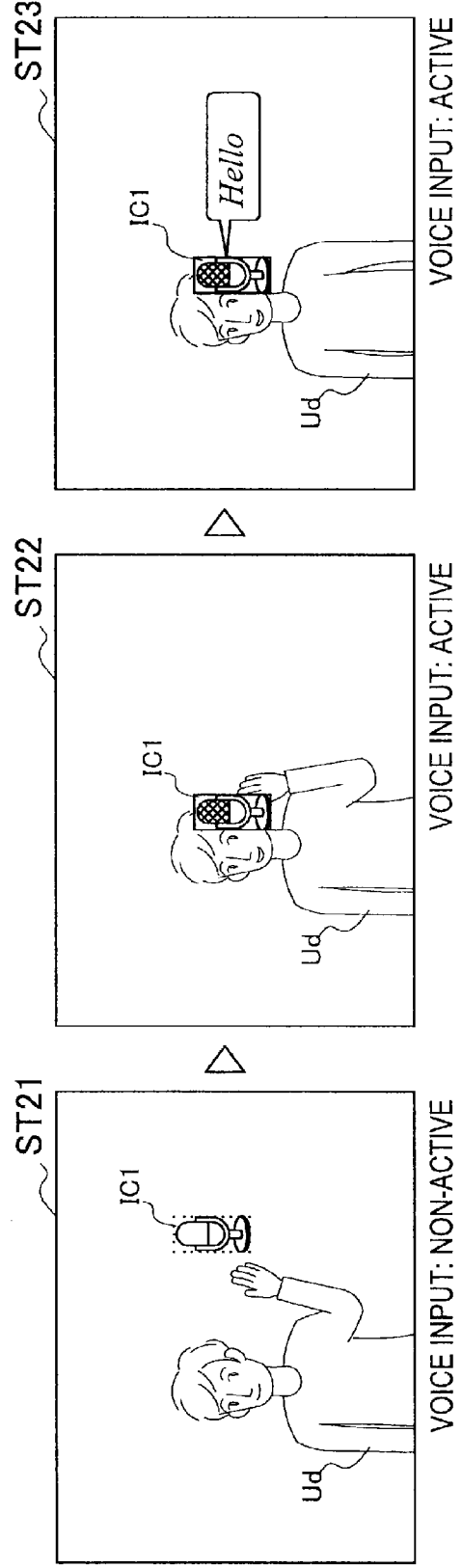

[Fig. 22]
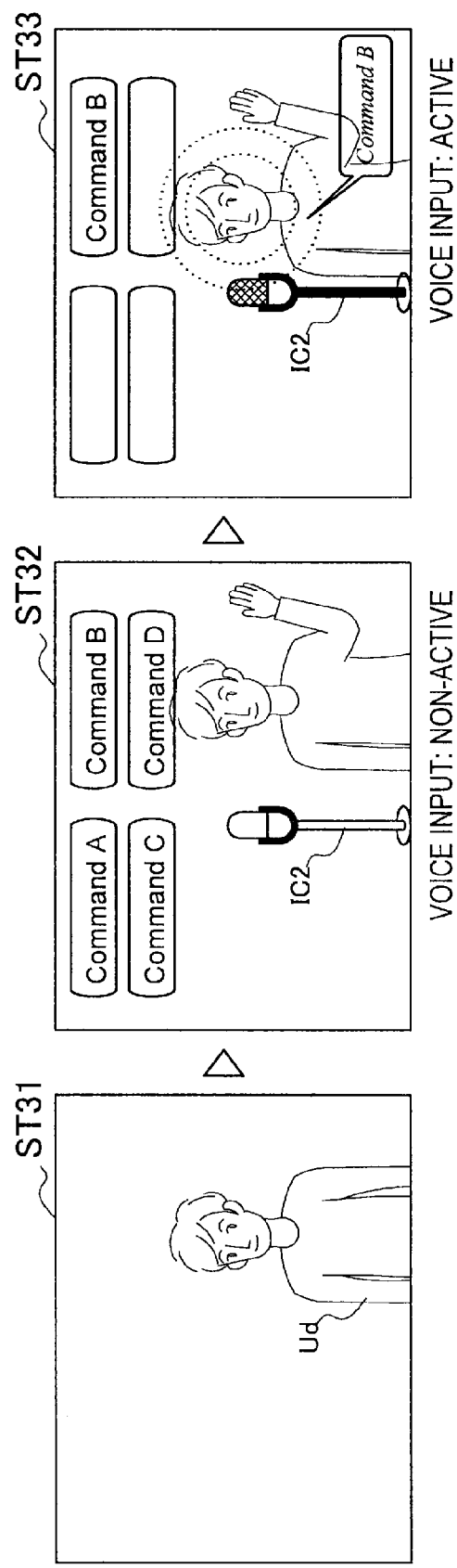

[Fig. 23]
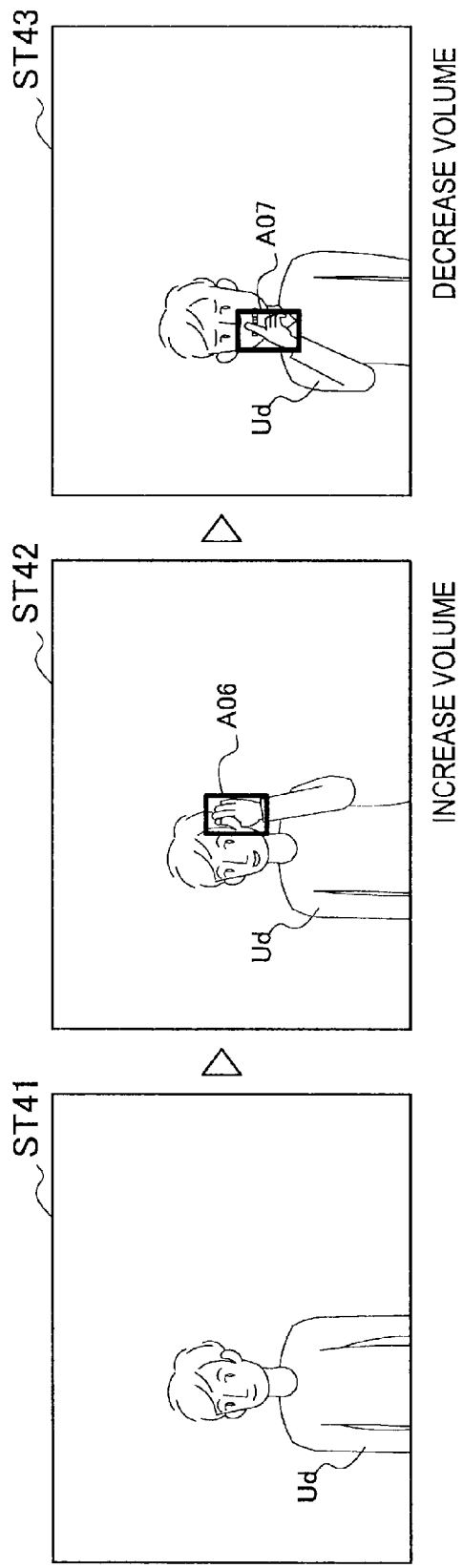

[Fig. 24]
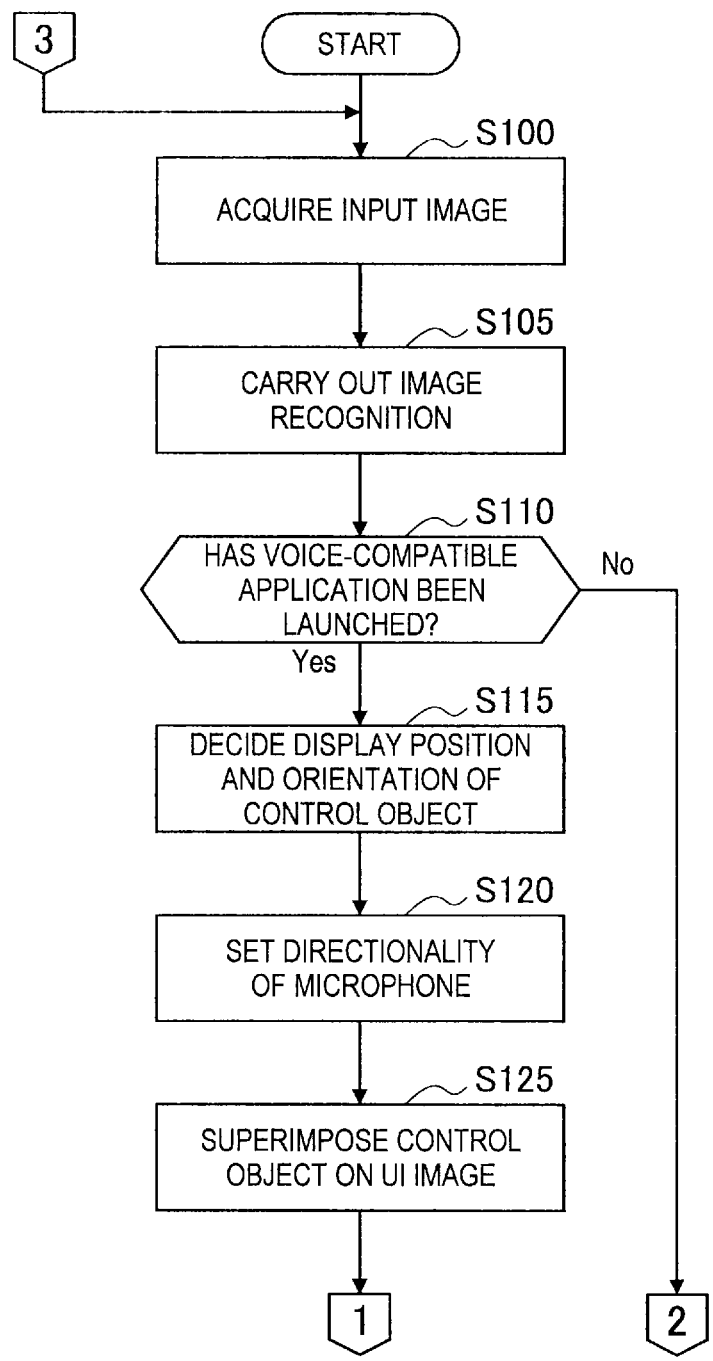

[Fig. 25]
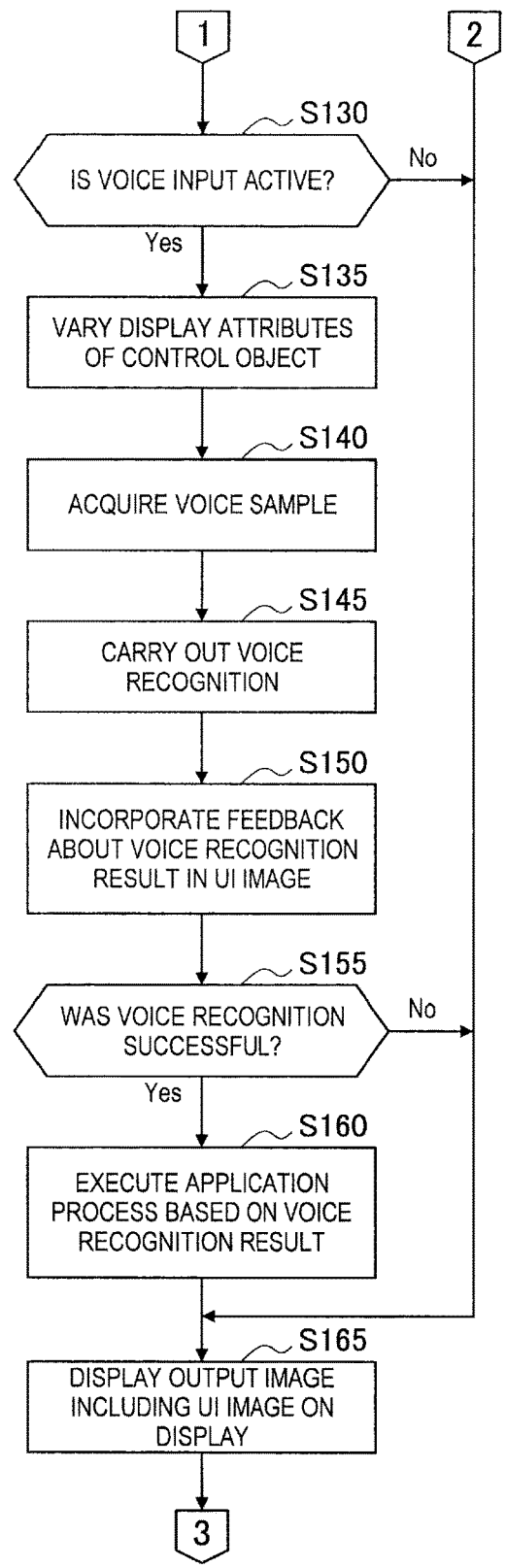

[Fig. 26]
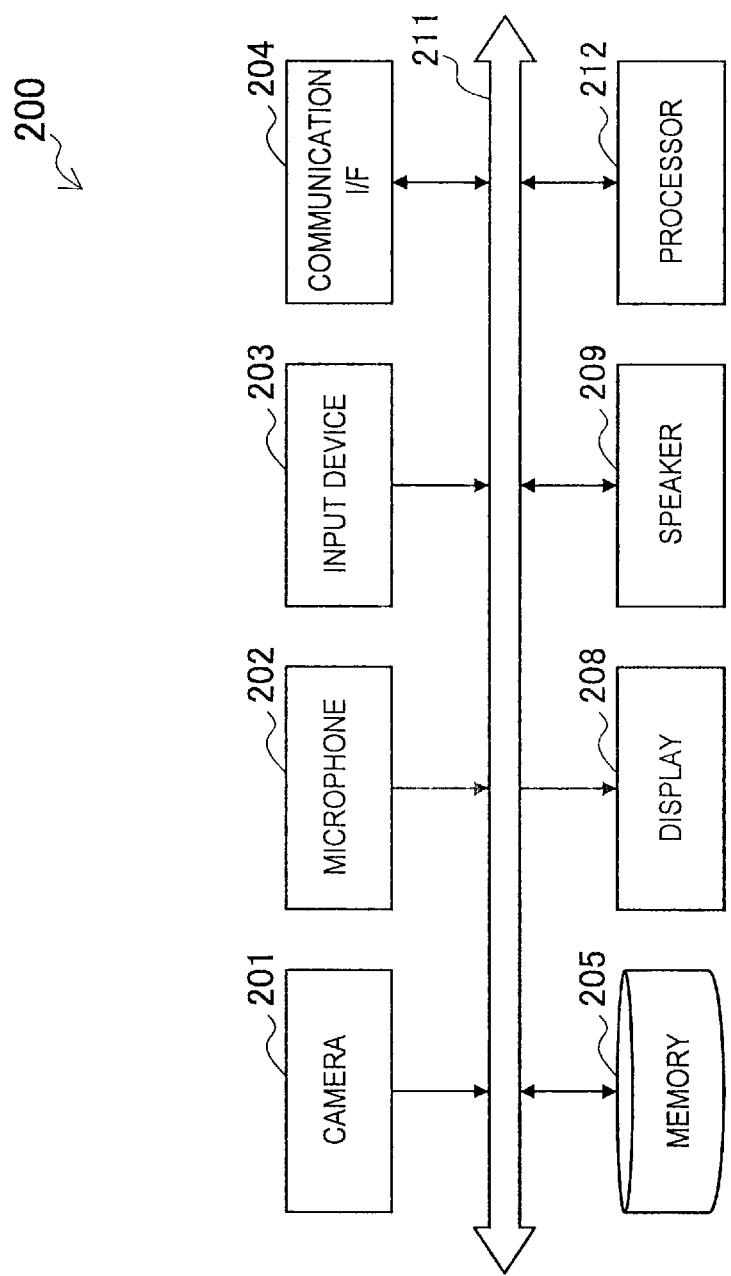

[Fig. 27]
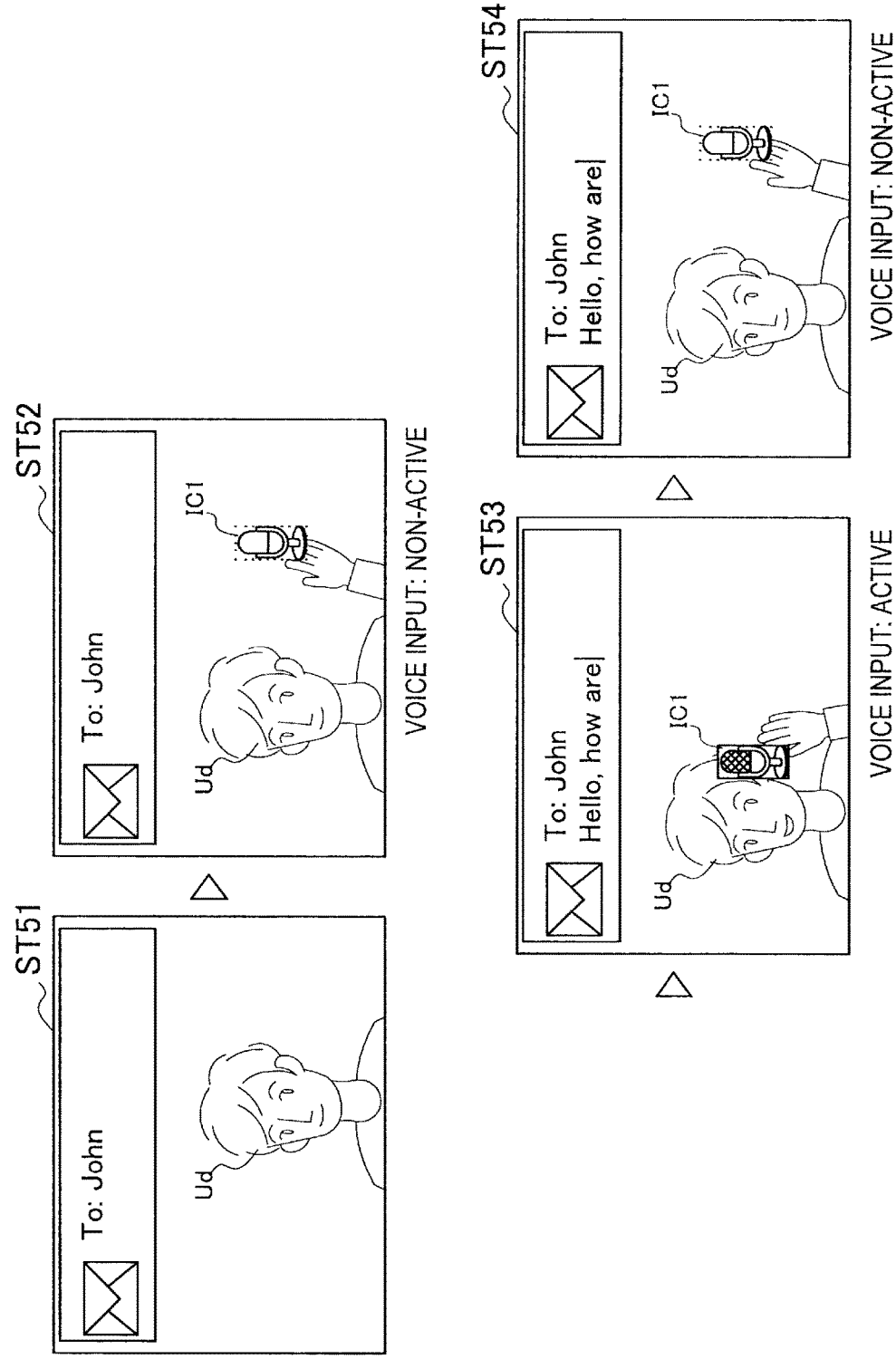

INFORMATION PROCESSING APPARATUS, INFORMATION PROCESSING METHOD, AND PROGRAM

TECHNICAL FIELD

The present disclosure relates to an information processing apparatus, an information processing method, and a program.

The present disclosure contains subject matter related to that disclosed in Japanese Priority Patent Application JP 2012-246118 filed in the Japan Patent Office on Nov. 8, 2012, the entire content of which is hereby incorporated by reference.

BACKGROUND ART

In the past, voice recognition has been used as a technology that assists users when inputting into an information appliance. As one example, JP 2012-58838 discloses a technology that converts the content of a voice sample produced by the user to text using voice recognition and displays the obtained text on a screen used for communication between a plurality of users.

CITATION LIST

Patent Literature

PTL 1: JP 2012-58838A

SUMMARY

Technical Problem

However, in many cases, there are discrepancies between the timing at which voice recognition is functional and voice input is active and the timing at which a user produces a voice sample for voice recognition. If such timing does not match, problems can occur, such as voice recognition not being carried out on the intended voice sample or voice recognition being carried out on an unintended voice sample.

Accordingly, it would be desirable to provide a novel and improved framework that assists users in producing voice samples for voice recognition at appropriate timing.

Solution to Problem

According to one embodiment, an information processing system is described that includes processing circuitry configured to generate data to control a display device to superimpose on a displayed image a control object associated with a voice input, wherein the displayed image is a feedback image of a gesture operation performed by a user, and the displayed image is an image derived from a camera-captured image.

According to another embodiment, an information processing method include generating with processing circuitry data to control a display device to superimpose on a displayed image a control object associated with a voice input, wherein the displayed image is a feedback image of a gesture operation performed by a user, and the displayed image is an image derived from a camera-captured image.

According to another embodiment, a non-transitory computer readable storage medium is described that has computer readable instructions stored therein that when executed by processing circuitry perform an information processing method, the method including generating with the processing circuitry data to control a display device to superimpose on a displayed image a control object associated with a voice input, wherein the displayed image is a feedback image of a gesture operation performed by a user, and the displayed image is an image derived from a camera-captured image.

Advantageous Effects of Invention

According to the above embodiments of the present disclosure, it is possible to assist users in producing voice samples for voice recognition at appropriate timing.

BRIEF DESCRIPTION OF DRAWINGS

FIG. 1 is a diagram useful in explaining an overview of an information processing apparatus according to a first embodiment of the present disclosure.

FIG. 2 is a diagram useful in explaining an overview of an information processing apparatus according to a second embodiment of the present disclosure.

FIG. 3 is a block diagram showing an example hardware configuration of the information processing apparatus according to the first embodiment.

FIG. 4 is a block diagram showing an example configuration of logical functions of the information processing apparatus according to the first embodiment.

FIG. 5 is a diagram useful in explaining one example of the result of image recognition.

FIG. 6 is a diagram useful in explaining another example of the result of image recognition.

FIG. 7 is a diagram useful in explaining a first example of a control object used to control voice recognition.

FIG. 8 is a diagram useful in explaining a second example of a control object used to control voice recognition.

FIG. 9 is a diagram useful in explaining a first example of an activation condition for activating voice input.

FIG. 10 is a diagram useful in explaining a second example of an activation condition for activating voice input.

FIG. 11 is a diagram useful in explaining one example of visual feedback of a voice recognition result.

FIG. 12 is a first diagram useful in explaining an example of an additional display object expressing the recognized content of a voice sample.

FIG. 13 is a second diagram useful in explaining an example of an additional display object expressing the recognized content of a voice sample.

FIG. 14 is a diagram useful in explaining an example of an additional display object that assists voice recognition.

FIG. 15 is a first diagram useful in explaining an example of control over the directionality of a microphone.

FIG. 16 is a second diagram useful in explaining an example of control over the directionality of a microphone.

FIG. 17 is a third diagram useful in explaining an example of control over the directionality of a microphone.

FIG. 18 is a diagram useful in explaining a first example of the window composition of an output image.

FIG. 19 is a diagram useful in explaining a second example of the window composition of an output image.

FIG. 20 is a diagram useful in explaining a first control scenario.

FIG. 21 is a diagram useful in explaining a second control scenario.

FIG. 22 is a diagram useful in explaining a third control scenario.

FIG. 23 is a diagram useful in explaining a fourth control scenario.

FIG. 24 is the former half of a flowchart showing an example of the flow of processing according to the first embodiment.

FIG. 25 is the latter half of the flowchart showing an example of the flow of processing according to the first embodiment.

FIG. 26 is a block diagram showing an example hardware configuration of the information processing apparatus according to the second embodiment.

FIG. 27 is a diagram useful in explaining an example of a control scenario in the second embodiment.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.

1. Overview
2. First Embodiment
2-1. Example Hardware Configuration
2-2. Example Functional Configuration
2-3. Example Control Scenarios
2-4. Example Processing Flow
3. Second Embodiment
4. Conclusion 1. Overview First, an overview of an information processing apparatus to which the technology according to an embodiment of the present disclosure can be applied will be described with reference to FIGS. 1 and 2. The technology according to an embodiment of the present disclosure can be applied to a variety of apparatuses and systems that use voice recognition as part of a user interface. As examples, the technology according to an embodiment of the present disclosure can be applied to a digital home appliance such as a television apparatus, a digital still camera, or a digital video camera. The technology according to an embodiment of the present disclosure can also be applied to a terminal apparatus such as a PC (Personal Computer), a smartphone, a PDA (Personal Digital Assistant), or a game console. The technology according to an embodiment of the present disclosure can also be applied to a special-purpose system or apparatus such as a karaoke system or an amusement apparatus.

FIG. 1 is a diagram useful in explaining an overview of an information processing apparatus 100 according to a first embodiment of the present disclosure. As shown in FIG. 1, the information processing apparatus 100 is a television apparatus. The information processing apparatus 100 includes a camera 101, a microphone 102, and a display 108. The camera 101 picks up images of users who are looking at the display 108 of the information processing apparatus 100. The microphone 102 picks up voice samples produced by such users. The display 108 displays images generated by the information processing apparatus 100. The images displayed by the display 108 may include user interface (UI) images in addition to content images. In the example in FIG. 1, users Ua and Ub are looking at the display 108. On the display 108, a UI image W01 is displayed. The UI image W01 is generated using a picked-up image picked up by the camera 101 and realizes a so-called "mirror image" display that can be an actual image of the user or an avatar of the user. The information processing apparatus 100 has a voice recognition function. By making a voice input into the information processing apparatus 100 via the microphone 102, the users Ua and Ub are capable of operating the information processing apparatus 100 or inputting information into the information processing apparatus 100.

FIG. 2 is a diagram useful in explaining an overview of an information processing apparatus 200 according to a second embodiment of the present disclosure. As shown in FIG. 2, the information processing apparatus 200 is a tablet PC. The information processing apparatus 200 includes a camera 201, a microphone 202, and a display 208. The camera 201 picks up images of users who are looking at the display 208 of the information processing apparatus 200. The microphone 202 picks up voice samples produced by such users. The display 208 displays images generated by the information processing apparatus 200. The images displayed by the display 208 may include user interface (UI) images in addition to content images. In the example in FIG. 2, a user Uc is looking at the display 208. On the display 208, a UI image W02 is displayed. The UI image W02 is generated using a picked-up image picked up by the camera 201 and realizes a so-called "mirror image" display. The information processing apparatus 200 has a voice recognition function. By making a voice input into the information processing apparatus 200 via the microphone 202, the user Uc is capable of operating the information processing apparatus 200 or inputting information into the information processing apparatus 200.

For such apparatuses, while the voice recognition function is operating and voice inputting is active, there is no guarantee that everything a user says, i.e., not every voice sample, will be intended for voice recognition. There is also the possibility of a user producing voice samples intended for voice recognition when voice input is not active. Such discrepancies in timing can lead to problems for the user such as voice samples not intended for voice recognition being subjected to voice recognition or voice recognition being unsuccessful. For this reason, the information processing apparatuses 100 and 200 assist users in producing voice samples intended for voice recognition at appropriate timing in accordance with the framework described in detail in the following sections.

2. First Embodiment 2-1. Example Hardware Configuration

FIG. 3 is a block diagram showing an example hardware configuration of the information processing apparatus 100 that may be implemented in a single apparatus or distributed resources in multiple units. As shown in FIG. 3, the information processing apparatus 100 includes the camera 101, the microphone 102, an input device 103, a communication interface (I/F) 104, a memory 105, a tuner 106, a decoder 107, a display 108, a speaker 109, a remote control I/F 110, a bus 111, and a processor 112 (which is one example of processing circuitry, such as a CPU).

(1) Camera

The camera 101 includes an image pickup element such as a CCD (Charge Coupled Device) or a CMOS (Complementary Metal Oxide Semiconductor) and picks up images. The images picked up by the camera 101 (frames that construct video) are treated as input images for processing by the information processing apparatus 100.

(2) Microphone

The microphone 102 picks up a voice sample produced by a user and generates a voice signal. The voice signal generated by the microphone 102 is treated as an input voice intended for voice recognition by the information processing apparatus 100. The microphone 102 may be an omnidirectional microphone or a microphone with fixed or variable directionality. In another scenario, the microphone 102 has variable directionality and has its directionality dynamically controlled.

(3) Input Device

The input device 103 is a device used by the user to directly operate the information processing apparatus 100. As examples, the input device 103 may include buttons, switches, dials, and the like disposed on the housing of the information processing apparatus 100. On detecting a user input, the input device 103 generates an input signal corresponding to the detected user input.

(4) Communication Interface

The communication I/F 104 acts as an intermediary for communication between the information processing apparatus 100 and another apparatus. The communication I/F 104 supports an arbitrary wireless communication protocol or wired communication protocol and establishes a communication connection with the other apparatus.

(5) Memory

The memory 105 is constructed of a storage medium such as a semiconductor memory or a hard disk drive and stores programs and data for processing by the information processing apparatus 100, as well as content data. As one example, the data stored by the memory 105 may include characteristic data used for image recognition and voice recognition, described later. Note that some or all of the programs and data described in the present specification may not be stored by the memory 105 and instead may be acquired from an external data source (as examples, a data server, network storage, or an externally-attached memory).

(6) Tuner

The tuner 106 extracts and demodulates a content signal on a desired channel from a broadcast signal received via an antenna (not shown). The tuner 106 then outputs the demodulated content signal to the decoder 107.

(7) Decoder

The decoder 107 decodes content data from the content signal inputted from the tuner 106. The decoder 107 may decode content data from a content signal received via the communication I/F 104. Content images may be generated based on the content data decoded by the decoder 107.

(8) Display

The display 108 has a screen constructed of an LCD (Liquid Crystal Display), an OLED (Organic Light-Emitting Diode), a CRT (Cathode Ray Tube), or the like and displays images generated by the information processing apparatus 100. As examples, content images and UI images that were described with reference to FIGS. 1 and 2 may be displayed on the screen of the display 108.

(9) Speaker

The speaker 109 has a diaphragm and circuit elements such as an amplifier and outputs audio based on an output voice signal generated by the information processing apparatus 100. The volume of the speaker 109 is variable.

(10) Remote Control Interface

The remote control I/F 110 is an interface that receives a remote control signal (an infrared signal or other wireless signal) transmitted from a remote controller used by the user. On detecting a remote control signal, the remote control I/F 110 generates an input signal corresponding to the detected remote control signal.

(11) Bus

The bus 111 connects the camera 101, the microphone 102, the input device 103, the communication I/F 104, the memory 105, the tuner 106, the decoder 107, the display 108, the speaker 109, the remote control I/F 110, and the processor 112 to each other.

(12) Processor

As examples, the processor 112 may be a CPU (Central Processing Unit) or a DSP (Digital Signal Processor). By executing a program stored in the memory 105 or on another storage medium, the processor 112 causes the information processing apparatus 100 to function in various ways as described later.

2-2. Example Functional Configuration

FIG. 4 is a block diagram showing an example configuration of logical functions realized by the memory 105 and the processor 112 of the information processing apparatus 100 shown in FIG. 3. As shown in FIG. 4, the information processing apparatus 100 includes an image acquisition unit 120, a voice acquisition unit 130, an application unit 140, a recognition unit 150, a characteristics database (DB) 160, and a control unit 170. The recognition unit 150 includes an image recognition unit 152 and a voice recognition unit 154. The control unit 170 includes a recognition control unit 172 and a display control unit 174. Note that some of the functional blocks shown in FIG. 4 may be realized by apparatuses outside the information processing apparatus 100 (such as apparatuses in a cloud computing environment). As one example, instead of carrying out the image recognition process described below by itself, the image recognition unit 152 may have such process carried out by an external image recognition function. In the same way, instead of carrying out the voice recognition process described below by itself, the voice recognition unit 154 may have such process carried out by an external voice recognition function.

(1) Image Acquisition Unit

The image acquisition unit 120 acquires an image picked up by the camera 101 as an input image. The input image is typically an individual frame in a series of frames that construct video in which users appear. The image acquisition unit 120 then outputs the acquired input image to the recognition unit 150 and the control unit 170.

(2) Voice Acquisition Unit

The voice acquisition unit 130 acquires the voice signal generated by the microphone 102 as an input voice. The voice acquisition unit 130 then outputs the acquired input voice to the recognition unit 150.

(3) Application Unit

The application unit 140 carries out the various application functions of the information processing apparatus 100. As examples, a television program reproduction function, an electronic program guide display function, a recording setting function, a photo reproduction function, a video reproduction function, a music reproduction function, and an Internet browsing function may be carried out by the application unit 140. The application unit 140 outputs application images (which may include content images) and audio generated via the application function to the control unit 170.

In the present embodiment, at least some of the application functions carried out by the application unit 140 operate in concert with the voice recognition unit 154, described later, and receive a voice input from a user. As one example, the television program reproduction function may change settings, such as the channel to be reproduced and the volume, in accordance with voice commands recognized by the voice recognition unit 154. The electronic program guide display function may change the channel or time period of the electronic program guide to be displayed in accordance with voice commands recognized by the voice recognition unit 154. The photo reproduction function may reproduce photos picked up on a specified date recognized by the voice recognition unit 154. The Internet browsing function may carry out an Internet search using keywords recognized by the voice recognition unit 154.

(4) Image Recognition Unit

The image recognition unit 152 recognizes the body of a user appearing in an input image inputted from the image acquisition unit 120. As one example, by matching image characteristic values extracted from the input image against image characteristic values stored in advance by the characteristics DB 160 for a specific part of the user's body, such specific part is recognized. As examples, the "specific part" may include at least one of the user's hands, mouth, and face.

FIG. 5 is a diagram useful in explaining one example of the result of image recognition by the image recognition unit 152. As shown in FIG. 5, the user Ua appears in the input image W03. The user Ua is facing the camera 101 and raising his left hand. By matching image characteristic values or using another known method, the image recognition unit 152 is capable of recognizing a hand region A01, a mouth region A02, and a face region A03 in the input image W03. The image recognition unit 152 then outputs position data showing the positions of such recognized regions to the control unit 170.

As one example, the image recognition unit 152 may identify the user by matching an image part (facial image) for the face region recognized within an input image against facial image data of known users stored in advance by the characteristics DB 160. As examples, the user identification result produced by the image recognition unit 152 can be used to make adjustments to the voice recognition, to personalize menus displayed in a UI image, or by the application unit 140 to recommend content. Note that the identification of users (that is, personal recognition) may be carried out based on the input voice, not on an input image.

In the present embodiment, the image recognition unit 152 can also recognize gestures of the user appearing in an input image. Note that in the present specification, the expression "gestures" is assumed to also include so-called "poses" (forms) that do not involve dynamic movement of the user's body.

FIG. 6 is a diagram useful in explaining another example of the result of image recognition by the image recognition unit 152. As shown in FIG. 6, the users Ua and Ub appear in the input image W04. The user Ua is making a gesture by placing the index finger of his right hand on his mouth. The image recognition unit 152 is capable of recognizing the hand region A04 in the input image W04 and also recognizing such gesture made by the user Ua. The user Ub is making a gesture by covering his mouth with both hands. The image recognition unit 152 is capable of recognizing the hand region A05 in the input image W04 and also recognizing such gesture made by the user Ub. On recognizing the users' gestures, the image recognition unit 152 outputs gesture data showing the types of recognized gestures to the control unit 170.

(5) Voice Recognition Unit

The voice recognition unit 154 carries out voice recognition on a voice sample inputted by the user based on an input voice inputted from the voice acquisition unit 130. In the present embodiment, voice input from the voice acquisition unit 130 to the voice recognition unit 154 is activated or deactivated by the recognition control unit 172. When voice input is active, the voice recognition unit 154 converts the input voice to text showing the content of the input voice. If an application being executed receives the inputting of free text, the voice recognition unit 154 may output text showing the content of the voice sample subjected to voice recognition to the application unit 140. Alternatively, if an application being executed receives the inputting of a voice command in a specific set of voice commands, the voice recognition unit 154 may output an identifier identifying the voice command recognized from the voice sample of the user to the application unit 140. The voice recognition unit 154 does not carry out voice recognition when voice input is not active.

The voice recognition unit 154 may also determine the level of the input voice inputted from the voice acquisition unit 130 and notify the control unit 170 of the determined level. The recognition control unit 172 described later is capable of giving various feedback to the user on the screen in accordance with the level of the input voice indicated by the voice recognition unit 154.

As described earlier, in a given scenario, the microphone 102 has variable directionality. In this case, the directionality of the microphone 102 is set by the recognition control unit 172, described later. The voice recognition unit 154 then carries out voice recognition on a voice sample of a user positioned in a direction corresponding to the set directionality using the voice signal acquired by the microphone 102.

(6) Characteristics DB

The characteristics DB 160 stores image characteristics data, which is to be used in image recognition by the image recognition unit 152, and voice characteristics data, which is to be used in voice recognition by the voice recognition unit 154, in advance. As one example, the image characteristics data may include known image characteristic values for specific parts, such as the hands, mouth, or face, of the user. The image characteristics data may also include facial image data for each user. The image characteristics data may also include gesture definition data defining gestures to be recognized by the image recognition unit 152. The voice characteristics data may include for example voice characteristic values showing the speech characteristics of individual users.

(7) Recognition Control Unit

The recognition control unit 172 generates an object that relates to speech and is to be superimposed on an input image. The recognition control unit 172 controls the voice recognition carried out by the voice recognition unit 154 using the generated object. Such object used to control voice recognition is hereinafter referred to as a "control object". The control object may move on the screen in accordance with operations by the user or may be displayed at a fixed position.

FIG. 7 is a diagram useful in explaining a first example of a control object. As shown in FIG. 7, a control object IC1 is superimposed on an input image W05. The control object IC1 is an icon that resembles a handheld microphone. As one example, when an application (referred to hereinafter as a "voice-compatible application") that receives a voice input from the user has been launched, the recognition control unit 172 has the control object IC1 displayed at a designated display position on the screen or near the body of the user recognized by the image recognition unit 152. The recognition control unit 172 then varies the display position of the control object IC1 in accordance with movement by the user (for example, movement of the hand region). The recognition control unit 172 may vary the orientation of the control object IC1 in accordance with movement by the user (for example, rotation of the hand region). When the voice-compatible application ends, the control object IC1 may be deleted from the screen or deactivated and moved to a default display position or an edge part of the screen.

FIG. 8 is a diagram useful in explaining a second example of a control object. As shown in FIG. 8, a control object IC2 is superimposed on an input image W06. The control object IC2 is an icon that resembles a stand-type microphone. As one example, when a voice-compatible application has been launched, the recognition control unit 172 has the control object IC2 displayed at a default display position on the screen. The display position of the control object IC2 does not move. When the voice-compatible application ends, the control object IC2 may be deleted from the screen.

Note that the control objects IC1 and IC2 shown in FIGS. 7 and 8 are mere examples. As examples, another type of icon that resembles a mouth or a loudspeaker or a text label may be used as a control object. Also, instead of the external appearance of a control object, the functionality of a control object may be related to speech.

In the present embodiment, the recognition control unit 172 controls the voice recognition carried out by the voice recognition unit 154 based on the positional relationship on the screen between a control object and a specific part of the user's body recognized by the image recognition unit 152. As one example, if an activation condition is satisfied based on such positional relationship, the recognition control unit 172 activates voice input into the voice recognition unit 154. If the activation condition is not satisfied, the recognition control unit 172 does not activate voice input into the voice recognition unit 154.

FIG. 9 is a diagram useful in explaining a first example of an activation condition for activating voice input. As shown in FIG. 9, the user Ua appears in input images W07a and W07b. The image recognition unit 152 recognizes the mouth region and the hand region of the user appearing in the input images. In this first example, the activation condition is a condition that the distance between the user's mouth and the control object is shorter than a distance threshold D1. In the drawing, a circle that is centered on a center point G2 of the mouth region and whose radius is equal to the distance threshold D1 is shown by a broken line. The recognition control unit 172 moves the control object IC1 on the screen in accordance with movement of the hand region A01 that has been recognized. In the upper part of FIG. 9, since the distance between the user's mouth and the control object IC1 is greater than the distance threshold D1, voice input is not active. That is, even if the user produces a voice sample (or noise is generated in the vicinity), the voice recognition unit 154 will not carry out voice recognition. Accordingly, during such time, unexpected operations by an application due to voice recognition that is unintended by the user are prevented. In the lower part of FIG. 9, as a result of the user moving his hand, the distance between the user's mouth and the control object IC1 is shorter than the distance threshold D1. For this reason, the recognition control unit 172 determines that the activation condition is satisfied and activates voice input. As a result, voice samples produced by the user are subjected to voice recognition by the voice recognition unit 154. Note that the distance between a part of the user's body aside from the mouth and the control object may be compared with the distance threshold described above.

FIG. 10 is a diagram useful in explaining a second example of an activation condition for activating voice input. As shown in FIG. 10, the user Ub appears in the input images W08a and W08b. The control object IC2 is also superimposed on the input images W08a and W08b. The image recognition unit 152 recognizes a mouth region A06 of the user appearing in the input images. In this second example, the activation condition is a condition that the distance between the user's mouth and the control object is shorter than a distance threshold D2. In the drawing, a circle that is centered on a center point G2 of the control object and whose radius is equal to the distance threshold D2 is shown by a broken line. In the upper part of FIG. 10, since the distance between the user's mouth and the control object IC2 is greater than the distance threshold D2, voice input is not active. That is, even if the user produces a voice sample (or noise is generated in the vicinity), the voice recognition unit 154 will not carry out voice recognition. Accordingly, during such time, unexpected operations by an application due to voice recognition that is unintended by the user are prevented. In the lower part of FIG. 10, as a result of the user moving, the distance between the user's mouth and the control object IC2 is shorter than the distance threshold D2. For this reason, the recognition control unit 172 determines that the activation condition is satisfied and activates voice input. As a result, voice samples produced by the user are subjected to voice recognition by the voice recognition unit 154.

Note that the activation conditions described with reference to FIGS. 9 and 10 are mere examples. As another example, it is possible to define the detection of a specific gesture relating to a control object, such as touching the control object or lifting the control object up high, as the activation condition.

Once voice input has been activated, the recognition control unit 172 has the active state for voice input maintained until a specific deactivation condition is satisfied. As one example, the deactivation condition may be the simple opposite of the activation condition described above (for example, the distance between the user's mouth and the control object exceeding the distance threshold). Alternatively, the deactivation condition may be recognition by the image recognition unit 152 of a specific gesture by the user or the like. As one example, the gesture for deactivating voice input may be a gesture where the user touches his/her mouth with his/her index finger. The deactivation condition may also include successful recognition of a single voice command or a specific length of time passing from activation.

While voice input is active, the recognition control unit 172 also controls visual feedback to the user relating to the voice recognition by the voice recognition unit 154.

As one example, the recognition control unit 172 notifies the user that voice input into the voice recognition unit 154 has been activated by varying the display attributes of a control object. As examples, the display attributes of the control object varied by the recognition control unit 172 may include at least one of color, luminance, transparency, size, shape, and texture. In the examples in FIGS. 9 and 10, voice input is shown as active or non-active by changing the texture of the control object.

As another example, the recognition control unit 172 gives the user feedback on the level of the input voice indicated by the voice recognition unit 154. The feedback on the level of the input voice may be given by varying the display attributes of the control object or by varying the state of the UI image on which the control object is superimposed. FIG. 11 is a diagram useful in explaining one example of visual feedback of a voice recognition result. As shown in FIG. 11, an effect Fb1 is applied to a UI image W09 on which the control object IC1 is superimposed. The effect Fb1 represents a state of the UI image where waves appear to be emitted from the control object IC1 (which may be the user's mouth). Such effect Fb1 may be removed if the level of the input voice falls below a specific threshold. By providing such feedback, it is possible for the user to intuitively grasp whether voice samples produced by the user himself/herself are being appropriately detected by the information processing apparatus 100. The recognition control unit 172 may vary the level of change in the display attributes of the control object or the change in the state of the output image in accordance with the level of the input voice that exceeds the specific threshold described above. As one example, the effect Fb1 may be applied to an image region whose size increases as the level of the input voice increases. By doing so, it is possible for the user to intuitively grasp the level detected by the information processing apparatus 100 for the voice samples produced by the user himself/herself. Note that the recognition control unit 172 may vary the display attributes (for example, the color) of the effect Fb1 so as to indicate the status of the voice recognition and the presence or absence of an error. The result of comparing the level of the input voice with a specific standard value may be displayed as text in the UI image W09.

Also, as one example, the recognition control unit 172 may superimpose an additional display object including text expressing the content of the voice sample recognized by the voice recognition unit 154 in the vicinity of the user appearing in the input image. FIGS. 12 and 13 are diagrams useful in explaining examples of additional display objects expressing the recognized content of a voice sample. As shown in FIG. 12, the control object IC1 and an additional object Fb2 are superimposed on an UI image W10. The additional object Fb2 is a speech bubble including text expressing the content of a voice sample produced by the user Ua appearing in the UI image W10. By receiving such feedback, it is possible for the user to instantly grasp whether the voice sample produced by the user has been correctly recognized by the information processing apparatus 100. As shown in FIG. 13, the additional object Fb2 includes a random character string Str1. The random character string Str1 may be inserted into the additional object Fb2 when an input voice of a level that exceeds a specific threshold has been detected but voice recognition based on such input voice was unsuccessful. By receiving such feedback, it is possible for the user to instantly grasp that voice recognition was unsuccessful even though the level of the voice sample produced by the user himself/herself was sufficient. The user may be notified that voice recognition was unsuccessful by varying the display attributes of the additional object Fb2. Note that the additional object Fb2 may include spaces instead of a random character string. The length of the random character string or spaces may be decided in accordance with the length (in time) of the speech for which voice recognition was unsuccessful.

As another example, the recognition control unit 172 may superimpose an additional object showing the level of the voice being detected by the voice recognition unit 154 and a voice level that is necessary for voice recognition to be carried out effectively. The voice level that is necessary for voice recognition to be carried out effectively may be stored in advance by the memory 105 or may be dynamically calculated so as to depend on the noise level in the environment. FIG. 14 is a diagram useful in explaining an example of an additional display object that assists voice recognition. As shown in FIG. 14, the control object IC1, the additional object Fb2, and an additional object Fb3 are superimposed on a UI image W12. The additional object Fb2 is a speech bubble including text expressing the content of speech. Here, as a result of voice recognition being unsuccessful due to the level of the user's voice being insufficient, the background color of the additional object Fb2 is changed to a dark color. The additional object Fb3 is an indicator that indicates the voice level. The radius of the circle drawn with a broken line on the outside of the additional object Fb3 corresponds to the voice level necessary to carry out voice recognition effectively. The radius of the colored circle corresponds to the level of the input voice indicated by the voice recognition unit 154. If the level of the input voice increases, the colored circle increases. Note that the additional object Fb3 is not limited to the example in FIG. 14 and may be a bar-shaped indicator, for example. By receiving such feedback, it is possible for the user to intuitively grasp how much his/her voice should be raised to enable voice recognition to succeed when the level of a voice sample produced by the user was insufficient. Note that the recognition control unit 172 may vary the display attributes (for example, color) of the additional object Fb3 so as to indicate the status of voice recognition or the presence or absence of an error. The result of comparing the level of the input voice with a specific standard value may be displayed as text in the UI image W12.

If the microphone 102 has variable directionality, the recognition control unit 172 may improve the precision of voice recognition by setting the directionality of the microphone 102 using a control object. As one example, the recognition control unit 172 may set the directionality of the microphone 102 in accordance with the position on the screen of a control object. Also, the recognition control unit 172 may set the directionality of the microphone 102 in accordance with the orientation on the screen of a control object.

FIGS. 15 to 17 are diagrams useful in explaining examples of control over the directionality of a microphone. In the upper part of FIG. 15, the control object IC1 is superimposed on a UI image W13. The display position of the control object IC1 may vary according to movement of the hand region of the user Ua. At the illustrated time, the display position of the control object IC1 is slightly to the left of the center of the screen. In the lower part of FIG. 15, the positional relationship in real space between the information processing apparatus 100 and the user Ua when looking from a viewpoint above the user Ua's head is shown. As one example, the recognition control unit 172 sets the directionality of the microphone 102 at an angle R1 based on the angle of view of the camera 101 and the display position of the control object IC1. Since the user Ua is present in the direction of the angle R1, as a result, it becomes possible for the microphone 102 to pick up voice samples produced by the user Ua with higher quality.

In the upper part of FIG. 16, the control object IC1 is superimposed on a UI image W14. The users Ua and Ub also appear in the UI image W14. At the illustrated time, the display position of the control object IC1 is closer to the user Ub's face than the user Ua. In the lower part of FIG. 16, the positional relationship in real space between the information processing apparatus 100 and the users Ua and Ub when looking from a viewpoint above the heads of the users Ua and Ub is shown. As one example, the recognition control unit 172 sets the directionality of the microphone 102 at an angle R2 based on the angle of view of the camera 101 and the display position of the control object IC1. Since the user Ub is present in the direction of the angle R2, as a result, it is possible for the microphone 102 to pick up voice samples produced by the user Ub with higher quality.

In the upper part of FIG. 17, the control object IC1 is superimposed on a UI image W15. The orientation on the screen of the control object IC1 can be varied in accordance with the orientation of the hand region of the user Ua. The users Ua and Ub appear in the UI image W15. At the illustrated time, the control object IC1 is being operated by the user Ua and is being pointed in the direction of a face region A07 of the user Ub. In the lower part of FIG. 17, the positional relationship in real space between the information processing apparatus 100 and the users Ua and Ub when looking from a viewpoint above the heads of the users Ua and Ub is shown. As one example, the recognition control unit 172 sets the directionality of the microphone 102 at an angle R3 based on the display position and orientation of the control object IC1 and the position of the face region A07 of the user Ub. Since the user Ub is present in the direction of the angle R3, as a result, it is possible for the microphone 102 to pick up voice samples produced by the user Ub with higher quality.

According to the method described with reference to FIG. 16 or FIG. 17, when a plurality of users are present, by using the control object IC1 just as if it were a real microphone, it is possible to pass the right to speak for voice recognition between users.

Aside from the examples described above, a variety of user interfaces based on gestures by the user may be realized. As one example, the recognition control unit 172 may cancel the voice recognition result produced so far by the voice recognition unit 154 in accordance with recognition of a gesture where a user covers his/her mouth with his/her hand. By doing so, it is possible for the user to easily repeat a voice input when the user has produced a voice sample with an erroneous content or when the voice recognition unit 154 has erroneously recognized the content of a voice sample. The recognition control unit 172 may also increase or decrease the volume of the audio output from the speaker 109 in accordance with recognition of a gesture defined in advance.

The recognition control unit 172 may also superimpose text objects respectively expressing at least one voice command candidate on the input image. By doing so, it is possible for the user to appropriately give a necessary voice command, even when the user does not know beforehand the voice commands received by an application function.

(8) Display Control Unit

The display control unit 174 controls the displaying of images via the display 108. As one example, the display control unit 174 displays an application image inputted from the application unit 140 on the display 108. Also, if a voice-compatible application has been launched, the display control unit 174 displays a UI image generated by the recognition control unit 172 on the display 108. The display control unit 174 may display only UI images on the display 108 or may display a single output image generated by combining an application image and a UI image on the display 108.

FIGS. 18 and 19 show examples of the window composition of output images that may be used by the present embodiment. In such drawings, a UI window $W_{UI}$ and an application window $W_{APP}$ are displayed by the display 108.

The UI window $W_{UI}$ displays a UI image generated by the recognition control unit 172. The application window $W_{APP}$ displays an application image (for example, a content image) inputted from the application unit 140. In the first example in FIG. 18, the application window $W_{APP}$ is combined at the bottom right corner of the UI window $W_{UI}$. In the second example in FIG. 19, the UI window $W_{UI}$ is blended with one part of the application window $W_{APP}$. By using such window composition, as one example it is possible, even when the user does not have a remote controller to hand, for the user to operate the information processing apparatus 100 with his/her voice using control objects while viewing content images.

2-3. Example Control Scenarios

Examples of control scenarios that can be carried out by the information processing apparatus 100 described above will now be described with reference to FIGS. 20 to 23.

(1) First Scenario

FIG. 20 is a diagram useful in explaining a first control scenario. In FIG. 20, five UI images ST11 to ST15 are shown along a time axis.

A user Ud appears in the UI image ST11, and a mirror image display is realized.

The next UI image ST12 may be displayed for example after a voice-compatible application has been launched or when the user has made a gesture, such as raising his hand. The control object IC1 is superimposed on the UI image ST12. However, at this time, voice input into the voice recognition unit 154 has not been activated.

The next UI image ST13 may be displayed for example after the user Ud has moved the control object IC1 to the vicinity of his mouth. As a result of the activation condition being satisfied, the recognition control unit 172 activates voice input into the voice recognition unit 154. In the UI image ST13, the display attributes of the control object IC1 change so as to indicate the active state.

The next UI image ST14 may be displayed while the user Ud is producing a voice sample. In the UI image ST14, the display attributes of the control object IC1 continue to indicate the active state. Also, the effect Fb1 is applied to the UI image ST14 and an additional object Fb2 showing the content of the recognized voice sample is superimposed on the UI image ST14.

The next UI image ST15 may be displayed when the deactivation condition is satisfied. Here, it is assumed that a gesture of touching the mouth with the index finger has been defined as a gesture for deactivating voice input. In accordance with the recognition of such gesture, the recognition control unit 172 deactivates voice input into the voice recognition unit 154. The display position of the control object IC1 is returned to a default display position and the display attributes of the control object IC1 are changed so as to indicate a non-active state.

(2) Second Scenario

FIG. 21 is a diagram useful in explaining a second control scenario. In FIG. 21, five UI images ST21 to ST25 are shown along a time axis.

The user Ud appears in the UI image ST21. The control object IC1 is also superimposed on the UI image ST21. However, at this time, voice input into the voice recognition unit 154 has not been activated.

The next UI image ST22 may be displayed for example after the user Ud has moved the control object IC1 to the vicinity of his mouth. As a result of the activation condition being satisfied, the recognition control unit 172 activates voice input into the voice recognition unit 154. In the UI image ST22, the display attributes of the control object IC1 change so as to indicate the active state.

The next UI image ST23 may be displayed while the user Ud is producing a voice sample. In the UI image ST23, the display attributes of the control object IC1 continue to indicate the active state. In this second scenario, while the user Ud is producing a voice sample, the display position of the control object IC1 is kept in the vicinity of the user Ud's mouth regardless of hand movements. Accordingly, if the user inputs a long text such as an e-mail message as a voice sample, it is possible to continue the voice input without the user continuously raising his hand and becoming tired.

In the next UI image ST24, the user Ud is making a gesture of covering his mouth with his hands. The recognition control unit 172 cancels the voice recognition result so far in accordance with recognition of such gesture. In the second control scenario, the active state for voice input into the voice recognition unit 154 is maintained thereafter.

In the next UI image ST25, the user Ud produces another voice sample. As a result, a voice sample with a different content to the content of the voice sample initially produced by the user Ud is appropriately recognized by the voice recognition unit 154.

(3) Third Scenario

FIG. 22 is a diagram useful in explaining a third control scenario. In FIG. 22, three UI images ST31 to ST33 are shown along a time axis.

A user Ud appears in the UI image ST31 and a mirror image display is realized.

The next UI image ST32 may be displayed for example after the user has made a gesture, such as raising his hand. The control object IC2 is superimposed on the UI image ST32. Four text objects respectively expressing voice command candidates (command A to command D) received by a voice-compatible application are also superimposed on the UI image ST32.

In the next UI image ST33, as a result of the user Ud approaching the vicinity of the control object IC12, for example, voice input is activated. The user Ud then produces a voice sample so as to read out a command B and the spoken command B is appropriately recognized by the voice recognition unit 154. As examples, the voice command candidates may be at least one command provided in advance in order for the user to remotely control the information processing apparatus 100.

In this way, in the present embodiment, it is possible for the user to remotely control the information processing apparatus 100 even if the user does not have a remote controller at hand. As examples, even when the remote controller has been lost or the remote controller is being held by another user, the user is still able to control the information processing apparatus 100 at desired timing without feeling any stress. Note that after the UI image ST32 is displayed, the text objects expressing the voice commands A to D may be replaced with text objects expressing other voice command candidates in accordance with recognition of a specific voice command or gesture.

(4) Fourth Scenario

The fourth scenario is a supplementary scenario that does not involve control objects. FIG. 23 is a diagram useful in explaining the fourth control scenario. In FIG. 23, three UI images ST41 to ST43 are shown along a time axis.

The user Ud appears in the UI image ST41 and a mirror image display is realized.

In the next UI image ST42, the user Ud is making a gesture of cupping his hand to his ear. The recognition control unit 172 increases the volume of the audio output from the speaker 109 in accordance with recognition of such gesture. The increase in volume may change depending on the length of time for which the gesture is recognized.

In the next UI image ST43, the user Ud makes a gesture of touching his mouth with his index finger. The recognition control unit 172 decreases the volume of the audio output from the speaker 109 in accordance with recognition of such gesture. The decrease in volume may change depending on the length of time for which the gesture is recognized.

In this way, in the present embodiment, various user interfaces may be realized based on user gestures. Depending on whether voice input is active or whether a voice-compatible application is being carried out, the same type of gesture may be interpreted as having different meanings. Note that a user interface for allowing the user to register gestures that are original to the user may be provided. As one example, a gesture of pushing way (a control object) with the hand may be registered and such gesture may be defined as a gesture for activating/deactivating voice input. A user interface for allowing users to customize the mapping between the movements for individual gestures and the processing corresponding to such gestures may also be provided.

2-4. Example Processing Flow

The flowcharts in FIGS. 24 and 25 show examples of flow of processing that may be carried out by the information processing apparatus 100 according to the present embodiment. The processing described here is repeated for each frame in a series of frames that construct video picked up by the camera 101.

As shown in FIG. 24, first the image acquisition unit 120 acquires an image picked up by the camera 101 as an input image (step S100). The image acquisition unit 120 then outputs the acquired input image to the recognition unit 150 and the control unit 170.

Next, the image recognition unit 152 recognizes the body of the user appearing in the input image inputted from the image acquisition unit 120 (step S105). For example, the image recognition unit 152 recognizes the hand region and the mouth region of the user in the input image and outputs position data showing the positions of such recognized regions to the control unit 170. The image recognition unit 152 may additionally recognize a number of user gestures that are defined in advance.

The recognition control unit 172 next determines whether a voice-compatible application has been launched (step S110). If a voice-compatible application has not been launched, the processing in the following steps S115 to S160 is skipped. If a voice-compatible application has been launched (or if a voice-compatible application is launched by a gesture recognized in step S105), the processing proceeds to step S115.

In step S115, the recognition control unit 172 decides the display position and orientation of a control object relating to speech (step S115). The display position of a control object may be a default position or may move so as to track movement of the user's hand recognized by the image recognition unit 152. In the same way, the orientation of a control object may be a default orientation or may rotate so as to track movement of the user's hand.

After this, if the microphone 102 has variable directionality, the recognition control unit 172 sets the directionality of the microphone 102 in accordance with the display position and orientation of the control object decided in step S115 (step S120).

Next, the recognition control unit 172 superimposes a control object with the display position and orientation decided in step S115 onto a UI image that displays a mirror image of the input image (step S125). Here, the display attributes of the control object may be set at values indicating that voice input has not been activated.

Returning to FIG. 25, the recognition control unit 172 next determines whether voice input is active in accordance with the activation condition and the deactivation condition described earlier (step S130). As one example, it is determined that the activation condition is satisfied when the distance between the mouth region of the user and the control object is below a distance threshold. If it is not determined that voice input is active, the processing in the following steps S135 to S160 is skipped. If it is determined that voice input is active, the processing proceeds to step S135.

In step S135, the recognition control unit 172 activates voice input into the voice recognition unit 154 as necessary and sets the display attributes of the control object at values that indicate that voice input has been activated (step S135).

Next, the voice acquisition unit 130 outputs the input voice acquired from the microphone 102 to the voice recognition unit 154 (step S140).

After this, the voice recognition unit 154 carries out voice recognition on the voice sample of the user based on the input voice inputted from the voice acquisition unit 130 (step S145). The voice recognition unit 154 then outputs the result of voice recognition to the application unit 140 and the recognition control unit 172.

Next, the recognition control unit 172 incorporates feedback about the voice recognition result inputted from the voice recognition unit 154 into the UI image (step S150). As one example, the recognition control unit 172 applies the effect Fb1 illustrated in FIG. 11 to the UI image. The recognition control unit 172 may also superimpose the additional object Fb2 or Fb3 illustrated in FIGS. 12 to 14 on the UI image.

After this, the recognition control unit 172 determines whether the voice recognition has succeeded (step S155). If the voice recognition has not succeeded, the processing in the following step S160 is skipped. If the voice recognition has succeeded, the processing proceeds to step S160.

In step S160, the application unit 140 carries out an application process based on the voice recognition result (step S160). For example, the application unit 140 may carry out processing corresponding to a recognized voice command. The application unit 140 may also receive text showing the content of the recognized voice sample as input information.

Next, the display control unit 174 displays an output image including the UI image on the display 108 (step S165). The output image displayed here may include only a UI image or may include both a UI image and an application image. After this, the processing returns to step S100 in FIG. 24.

Note that examples where only one control object is superimposed on a UI image have mainly been described so far. However, the present disclosure is not limited to such examples and a plurality of control objects may be superimposed on a UI image. As one example, when a plurality of users appear in the input image, if separate control objects are superimposed for the respective users, it is possible for the respective users to input voice commands at desired timing without an operation of passing a control object between users being necessary.

3. Second Embodiment

As described earlier, the technology according to an embodiment of the present disclosure is not limited to a television apparatus and can be applied to various types of apparatus. For this reason, an example where the technology according to an embodiment of the present disclosure has been applied to the information processing apparatus 200 that includes a messaging application will now be described as a second embodiment. As was described with reference to FIG. 2, the information processing apparatus 200 is a tablet PC.

(1) Example Hardware Configuration

FIG. 26 is a block diagram showing an example hardware configuration of the information processing apparatus 200. As shown in FIG. 26, the information processing apparatus 200 includes the camera 201, the microphone 202, an input device 203, a communication I/F 204, a memory 205, the display 208, a speaker 209, a bus 211, and a processor 212.

The camera 201 includes an image pickup element such as a CCD or a CMOS and picks up images. The images picked up by the camera 201 (frames that construct video) are treated as input images for processing by the information processing apparatus 200.

The microphone 202 picks up a voice sample produced by a user and generates a voice signal. The voice signal generated by the microphone 202 is treated as an input voice intended for voice recognition by the information processing apparatus 200.

The input device 203 is a device used by the user to directly operate the information processing apparatus 200 or to input information into the information processing apparatus 200. As one example, the input device 103 may include a touch panel, buttons, switches, and the like. On detecting a user input, the input device 203 generates an input signal corresponding to the detected user input.

The communication I/F 204 acts as an intermediary for communication between the information processing apparatus 200 and another apparatus. The communication I/F 204 supports an arbitrary wireless communication protocol or wired communication protocol and establishes a communication connection with the other apparatus.

The memory 205 is constructed of a storage medium such as a semiconductor memory or a hard disk drive and stores programs and data for processing by the information processing apparatus 200, as well as content data. Note that some or all of the programs and data may not be stored by the memory 205 and instead may be acquired from an external data source (as examples, a data server, network storage, or an externally attached memory).

The display 208 has a screen constructed of an LCD, an OLED, or the like and displays images generated by the information processing apparatus 200. As one example, the same UI images as those described in the first embodiment may be displayed on the screen of the display 208.

The speaker 209 has a diaphragm and circuit elements such as an amplifier and outputs audio based on an output audio signal generated by the information processing apparatus 200. The volume of the speaker 209 is variable.

The bus 211 connects the camera 201, the microphone 202, the input device 203, the communication I/F 204, the memory 205, the display 208, the speaker 209, and the processor 212 to each other.

As examples, the processor 112 may be a CPU or a DSP. By executing a program stored in the memory 205 or on another storage medium, in the same way as the processor 112 of the information processing apparatus 100 according to the first embodiment, the processor 212 causes the information processing apparatus 200 to function in various ways. Aside from differences in the application function, the configuration of the logical functions realized by the memory 205 and the processor 212 of the information processing apparatus 200 may be the same as the configuration of the information processing apparatus 100 illustrated in FIG. 4.

(2) Example Control Scenario

FIG. 27 is a diagram useful in explaining an example of a control scenario in the second embodiment. In FIG. 27, four UI images ST51 to ST54 are shown along a time axis. In this scenario, the respective output images are composed of an application image of a messaging application at the top and a UI image at the bottom.

In the output image ST51, the application image includes a message input box. A message has not been inputted into the message input box. The user Ud appears in the UI image and a mirror image display is realized.

The next output image ST52 may be displayed for example after the user has made a gesture, such as raising his hand. In the output image ST52, the control object IC1 is superimposed on the UI image. However, at this time, voice input has not been activated.

The next output image ST53 may be displayed for example after the user Ud has moved the control object IC1 to the vicinity of his mouth. Voice input is activated and the display attributes of the control object IC1 are changed to indicate the active state. The content of a voice sample produced by the user is inputted into the message input box.

The next output image ST54 may be displayed for example after the user Ud has moved the control object IC1 away from the vicinity of his mouth. Voice input is deactivated and the display attributes of the control object IC1 change so as to show a non-active state. Even if the user produces a voice sample in this state, the content of such voice sample will not be inputted into the message input box. Accordingly, by merely making a simple operation of moving his/her hand, the user can switch the state of voice input and include only the content of voice samples that the user wishes to input in a message.

4. Conclusion

Embodiments of the present disclosure have been described in detail so far with reference to FIGS. 1 to 27. According to the embodiments described earlier, control objects displayed superimposed on an input image are used to control voice recognition carried out by an information appliance. Accordingly, by using the state of a control object on the screen as a guide, the user is capable of determining suitable timing for voice recognition.

Also, according to the above embodiments, voice recognition is controlled based on the positional relationship between a control object and a specific part of the user's body recognized in an input image. Accordingly, by moving his/her own body which is displayed on the screen, the user is capable of handling various functionality relating to voice recognition.

Also, according to the embodiments described above, voice input for voice recognition may be activated based on the distance between the user's mouth and a control object. The control object may also move on the screen in accordance with movement of the user's hand. Accordingly, by moving a control object or conversely moving himself/ herself toward the control object, the user is capable of easily having voice recognition carried out on only a desired voice input at the intended timing. Since the necessary movement to be carried out at such time resembles the movement when a real microphone is handled, such framework makes it possible to realize a user interface that is intuitive to users.

Also, according to the embodiments described above, the user is notified of whether voice input has been activated via changes in the display attributes of a control object. Accordingly, it is possible for the user to speak at appropriate timing by merely paying attention to only a control object on the screen.

Note that the series of processes carried out by the various apparatuses described as embodiments of the present disclosure are typically realized using software. As one example, programs composed of software that realizes such series of processes are stored in advance on a storage medium (non-transitory medium) provided internally in or externally to such apparatuses. As one example, during execution, such programs are then written into RAM (Random Access Memory) and executed by a processor such as a CPU.

Although preferred embodiments of the present disclosure are described in detail above with reference to the appended drawings, the technical scope of the disclosure is not limited thereto. It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1)

An information processing system including:

processing circuitry configured to generate data to control a display device to superimpose on a displayed image a control object associated with a voice input, wherein the displayed image is a feedback image of a gesture operation performed by a user, and the displayed image is an image derived from a camera-captured image.

(2)

The information processing system of (1), wherein the displayed image is a mirror image of the user.

(3)

The information processing system of (1), wherein the processing circuitry is configured to initiate a process triggered by voice input based on a displayed positional relationship between the control object and a body part of a user in the feedback image.

(4)

The information processing system of (3), wherein the processing circuitry initiates the process when the displayed positional relationship has the control object within a predetermined distance from the body part of the user in the feedback image.

(5)

The information processing system of (3), wherein the body part of the user in the feedback image is at least a portion of a face of the user.

(6)
The information processing system of (3), wherein the processing circuitry initiates the process when the displayed positional relationship has the body part of the user in the feedback image within a predetermined direction from the control object.

(7)
The information processing system of (3), wherein the processing circuitry is configured to control the display device to change an image attribute of the control object to indicate that the processing circuitry initiated the process.

(8)
The information processing system of (3), wherein the process is a voice recognition process.

(9)
The information processing system of (1), wherein the processing circuitry is configured to control the display device to change a displayed position of the control object in response to the gesture operation performed by the user.

(10)
The information processing system of (1), wherein the processing circuitry is configured to control the display device to display an indicator that changes appearance according to a detection state of the voice input.

(11)
The information processing system of (1), wherein the processing circuitry is configured to control the display device to display an additional object, simultaneously with the feedback image, which is associated with the voice input and is different from the control object.

(12)
The information processing system of (11), wherein the additional object is a text information generated based on the voice input.

(13)
The information processing system of (11), wherein the additional object indicates a volume level of the voice input.

(14)
The information processing system of (8), wherein the processing circuitry is configured to control a function of a device based on the voice recognition.

(15)
The information processing system of (14), wherein the device is configured to control reproduction of a content, and
the processing circuitry is configured to control the display device to display the feedback image, the control object, and an image of the content which is object of the voice input at the same time.

(16)
The information processing system of (1), further including
the display device, wherein the display device and the processing circuitry are parts of a single apparatus.

(17)
The information processing system of (3), wherein the mirror image is an actual image of the user.

(18)
The information processing system of (3), wherein the mirror image is an avatar of the user.

(19)
An information processing method including
generating with processing circuitry data to control a display device to superimpose on a displayed image a control object associated with a voice input, wherein the displayed image is a feedback image of a gesture operation performed by a user, and the displayed image is an image derived from a camera-captured image.

(20)
A non-transitory computer readable storage medium having computer readable instructions stored therein that when executed by processing circuitry perform an information processing method, the method including
generating with the processing circuitry data to control a display device to superimpose on a displayed image a control object associated with a voice input, wherein the displayed image is a feedback image of a gesture operation performed by a user, and the displayed image is an image derived from a camera-captured image.

Additionally, the present technology may also be configured as below.

(1)
An information processing apparatus including:
an image acquisition unit acquiring an input image; and
a control unit displaying, on a screen, an object relating to speech superimposed on the input image,
wherein the control unit controls voice recognition carried out on a voice sample of a user using the object.

(2)
The information processing apparatus according to (1), further including:
an image recognition unit recognizing a body of a user appearing in the input image,
wherein the control unit controls the voice recognition based on a positional relationship on the screen between the object and a specific part of the body of the user recognized by the image recognition unit.

(3)
The information processing apparatus according to (2),
wherein the specific part includes a user's mouth, and
wherein the control unit activates voice input for the voice recognition based on a distance between the object and the user's mouth.

(4)
The information processing apparatus according to (3),
wherein the specific part includes a user's hand, and
wherein the control unit moves the object on the screen in accordance with movement of the user's hand.

(5)
The information processing apparatus according to (3) or (4),
wherein the control unit deactivates the voice input for the voice recognition in accordance with a gesture by the user appearing in the input image.

(6)
The information processing apparatus according to any one of (1) to (5), wherein the control unit notifies the user whether voice input for the voice recognition is activated by varying a display attribute of the object.

(7)
The information processing apparatus according to any one of (1) to (6),
wherein the control unit notifies the user of whether a voice sample has been detected during the voice recognition by varying any of a display attribute of the object and a state of an output image in which the object is superimposed.

(8)
The information processing apparatus according to (7),
wherein the control unit varies a level of a variation in the display attribute of the object or the state of the output image in accordance with a level of the voice sample detected during the voice recognition.

(9)

The information processing apparatus according to any one of (1) to (8), wherein the voice recognition is carried out on a voice signal acquired by a microphone with variable directionality.

(10)

The information processing apparatus according to (9), wherein the control unit varies a position of the object in accordance with movement of the user, and wherein the directionality of the microphone is set in accordance with the position of the object.

(11)

The information processing apparatus according to (9) or (10), wherein the control unit varies an orientation of the object in accordance with movement of the user, and wherein the directionality of the microphone is set in accordance with the orientation of the object.

(12)

The information processing apparatus according to any one of (1) to (11), wherein the control unit further superimposes a first additional object, which includes text expressing a content of the voice sample recognized by the voice recognition, in a vicinity of the user appearing in the input image.

(13)

The information processing apparatus according to (12), wherein the control unit is operable when the voice recognition has failed, to notify the user that the voice recognition has failed by one of varying a display attribute of the first additional object and inserting a special character string into the text.

(14)

The information processing apparatus according to any one of (1) to (13), wherein the control unit further superimposes a second additional object, which indicates a level of the voice sample detected during the voice recognition and a voice level necessary to carry out the voice recognition effectively, on the input image.

(15)

The information processing apparatus according to any one of (1) to (14), wherein the control unit further superimposes text objects respectively expressing candidates of at least one voice command on the input image.

(16)

The information processing apparatus according to (15), wherein the information processing apparatus is a television apparatus, and wherein the voice commands are commands issued by the user to remotely control the information processing apparatus.

(17)

The information processing apparatus according to any one of (1) to (16), wherein the object is an icon that resembles a microphone.

(18)

An information processing method carried out by an information processing apparatus, the information processing method including:

acquiring an input image; and displaying, on a screen, an object relating to speech superimposed on the input image, controlling voice recognition carried out on a voice sample of a user using the object.

(19)

A program for causing a computer controlling an information processing apparatus to function as:

an image acquisition unit acquiring an input image; and a control unit displaying, on a screen, an object relating to speech superimposed on the input image, wherein the control unit controls voice recognition carried out on a voice sample of a user using the object.

REFERENCE SIGNS LIST 100, 200 information processing apparatus
120 image acquisition unit
152 image recognition unit
154 voice recognition unit
172 recognition control unit
174 display control unit
IC1, IC2 control object

The invention claimed is:

1. An information processing system comprising:
processing circuitry configured to
generate data to control a display device to superimpose on a displayed image a control object associated with a voice input, wherein the displayed image is a feedback image of a gesture operation performed by a user, and the displayed image is an image derived from a camera-captured image,
activate a process associated with the voice input in response to a body part of the user being, in the feedback image, within a predetermined distance of the control object, which is superimposed on the displayed image, is associated with the voice input, and is not a body part of the user, and
deactivate the process associated with the voice input in response to the body part of the user being, in the feedback image, outside the predetermined distance of the control object, which is superimposed on the displayed image is associated with the voice input, and is not a body part of the user,
wherein the predetermined distance between the body part and the control object is relative to the displayed image.

2. The information processing system of claim 1, wherein the displayed image is a mirror image of the user.

3. The information processing system of claim 1, wherein the body part of the user in the feedback image is at least a portion of a face of the user.

4. The information processing system of claim 1, wherein the processing circuitry activates the process when the displayed positional relationship has the body part of the user in the feedback image within a predetermined direction from the control object.

5. The information processing system of claim 1, wherein the processing circuitry is configured to control the display device to change an image attribute of the control object to indicate that the processing circuitry activated the process.

6. The information processing system of claim 1, wherein the process is a voice recognition process.

7. The information processing system of claim 1, wherein the processing circuitry is configured to control the display device to change a displayed position of the control object in response to the gesture operation performed by the user.

8. The information processing system of claim 1, wherein the processing circuitry is configured to control the display device to display an indicator that changes appearance according to a detection state of the voice input.

9. The information processing system of claim 1, wherein
the processing circuitry is configured to control the display device to display an additional object, simultaneously with the feedback image, which is associated with the voice input and is different from the control object.

10. The information processing system of claim 9, wherein
the additional object is a text information generated based on the voice input.

11. The information processing system of claim 9, wherein
the additional object indicates a volume level of the voice input.

12. The information processing system of claim 6, wherein
the processing circuitry is configured to control a function of a device based on the voice recognition.

13. The information processing system of claim 12, wherein
the device is configured to control reproduction of a content, and
the processing circuitry is configured to control the display device to display the feedback image, the control object, and an image of the content which is object of the voice input at the same time.

14. The information processing system of claim 1, further comprising:
the display device, wherein the display device and the processing circuitry are parts of a single apparatus.

15. The information processing system of claim 2, wherein
the mirror image is an actual image of the user.

16. The information processing system of claim 2, wherein
the mirror image is an avatar of the user.

17. An information processing method comprising:
generating, with processing circuitry, data to control a display device to superimpose on a displayed image a control object associated with a voice input, wherein the displayed image is a feedback image of a gesture operation performed by a user, and the displayed image is an image derived from a camera-captured image;
activating, with the processing circuitry, a process associated with the voice input in response to a body part of the user being, in the feedback image, within a predetermined distance of the control object, which is superimposed on the displayed image, is associated with the voice input, and is not a body part of the user; and
deactivating, with the processing circuitry, the process associated with the voice input in response to the body part of the user being, in the feedback image, outside the predetermined distance of the control object, which is superimposed on the displayed image, is associated with the voice input, and is not a body part of the user,
wherein the predetermined distance between the body part and the control object is relative to the displayed image.

18. A non-transitory computer readable storage medium having computer readable instructions stored therein that when executed by processing circuitry perform an information processing method, the method comprising:
generating data to control a display device to superimpose on a displayed image a control object associated with a voice input, wherein the displayed image is a feedback image of a gesture operation performed by a user, and the displayed image is an image derived from a camera-captured image;
activating a process associated with the voice input in response to a body part of the user being, in the feedback image, within a predetermined distance of the control object, which is superimposed on the displayed image, is associated with the voice input, and is not a body part of the user; and
deactivating the process associated with the voice input in response to the body part of the user being, in the feedback image, outside the predetermined distance of the control object, which is superimposed on the displayed image, is associated with the voice input, and is not a body part of the user,
wherein the predetermined distance between the body part and the control object is relative to the displayed image.

19. The information processing system of claim 1, wherein the processing circuitry is configured to generate data to control the display device to deactivate and move the control object to an edge part of the display device.

* * * * *